(12) United States Patent
Pelloin

(10) Patent No.: US 11,645,293 B2
(45) Date of Patent: May 9, 2023

(54) ANOMALY DETECTION IN BIG DATA TIME SERIES ANALYSIS

(71) Applicant: EXFO Solutions SAS, Saint-Jacques-de-la-Lande (FR)

(72) Inventor: Fabrice Pelloin, Rennes (FR)

(73) Assignee: EXFO SOLUTIONS SAS, Rennes (FR)

( * ) Notice: Subject to any disclaimer, the term of this patent is extended or adjusted under 35 U.S.C. 154(b) by 437 days.

(21) Appl. No.: 16/708,605

(22) Filed: Dec. 10, 2019

(65) Prior Publication Data

US 2020/0183946 A1 Jun. 11, 2020

Related U.S. Application Data

(60) Provisional application No. 62/777,887, filed on Dec. 11, 2018.

(51) Int. Cl.
*G06F 16/25* (2019.01)
*G06F 16/2458* (2019.01)
(Continued)

(52) U.S. Cl.
CPC ........ *G06F 16/2477* (2019.01); *G06F 16/182* (2019.01); *G06F 16/2379* (2019.01);
(Continued)

(58) Field of Classification Search
CPC .. G06F 16/252; G06F 16/182; G06F 16/2379; G06F 16/2474; G06F 17/142; G06N 20/00; G06N 5/04
See application file for complete search history.

(56) References Cited

U.S. PATENT DOCUMENTS

| 5,761,653 A | 6/1998 | Schiefer et al. |
| 7,467,067 B2 | 12/2008 | Marvasti |

(Continued)

FOREIGN PATENT DOCUMENTS

| CN | 102801587 A | 11/2012 |
| EP | 3648406 A2 | 5/2020 |

(Continued)

OTHER PUBLICATIONS

M. Mdini, A. Blanc, G. Simon, J. Barotin and J. Lecoeuvre, "Monitoring the network monitoring system: Anomaly Detection using pattern recognition," 2017 IFIP/IEEE Symposium on Integrated Network and Service Management(IM), Lisbon, 2017, pp. 983-986.

(Continued)

*Primary Examiner* — Mariela Reyes
*Assistant Examiner* — Courtney Harmon
(74) *Attorney, Agent, or Firm* — McDonnell Boehnen Hulbert & Berghoff LLP

(57) ABSTRACT

An example embodiment may involve obtaining training time series data spanning an observation time window and comprising a series of values of a metric at regularly-spaced sample points in time, and analyzing the training time series data to determine one of a periodicity or a pseudo-periodicity across a plurality of consecutive sub-windows, each equal in size to a reference time period and each spanned by the same number N of sample points of metric values. A reference pattern corresponding to a model time series having no anomalies, as well as a reference threshold, may be determined and stored. Runtime time series data may then be obtained and time aligned with the reference pattern. Deviations between the runtime time series and the reference pattern may be identified as anomalies if they exceed (Continued)

the reference threshold. Identified anomalies may be displayed in a display device.

19 Claims, 16 Drawing Sheets

(51) Int. Cl.
  *G06N 20/00* (2019.01)
  *G06F 17/14* (2006.01)
  *G06F 16/23* (2019.01)
  *G06F 16/182* (2019.01)
  *G06N 5/04* (2023.01)

(52) U.S. Cl.
  CPC ........ *G06F 16/2474* (2019.01); *G06F 16/252* (2019.01); *G06F 17/142* (2013.01); *G06N 5/04* (2013.01); *G06N 20/00* (2019.01)

(56) References Cited

U.S. PATENT DOCUMENTS

| | | | |
|---|---|---|---|
| 7,590,728 B2 | 9/2009 | Tonnesen | |
| 7,617,170 B2 | 11/2009 | Chesla | |
| 7,620,523 B2 | 11/2009 | Marvasti et al. | |
| 7,783,745 B1* | 8/2010 | Bhargava | G06Q 10/06 709/224 |
| 7,886,064 B2 | 2/2011 | Nomura | |
| 7,953,685 B2 | 5/2011 | Liu et al. | |
| 8,582,457 B2 | 11/2013 | Leemet et al. | |
| 8,949,677 B1 | 2/2015 | Brundage et al. | |
| 9,026,644 B2 | 5/2015 | Parker et al. | |
| 9,122,602 B1 | 9/2015 | Jewell | |
| 9,172,593 B2 | 10/2015 | Kane | |
| 9,298,538 B2 | 3/2016 | Marvasti et al. | |
| 9,414,247 B2 | 8/2016 | Huang | |
| 9,418,088 B1 | 8/2016 | Noll | |
| 9,516,053 B1 | 12/2016 | Muddu et al. | |
| 9,614,742 B1 | 4/2017 | Zhang et al. | |
| 9,654,361 B2 | 5/2017 | Vasseur et al. | |
| 9,667,521 B2 | 5/2017 | Pietrowicz et al. | |
| 9,727,533 B2 | 8/2017 | Thibaux | |
| 9,729,386 B2 | 8/2017 | Kiesekamp | |
| 9,760,240 B2 | 9/2017 | Maheshwari et al. | |
| 9,853,867 B2 | 12/2017 | Baccarani | |
| 9,900,332 B2 | 2/2018 | Muddu et al. | |
| 9,952,921 B2 | 4/2018 | Kim et al. | |
| 9,961,571 B2 | 5/2018 | Yang | |
| 10,061,637 B1 | 8/2018 | Halbersberg | |
| 10,083,073 B2 | 9/2018 | Ambichl et al. | |
| 10,127,695 B2 | 11/2018 | Garvey et al. | |
| 10,165,457 B2 | 12/2018 | Fernandez Arboleda | |
| 10,198,339 B2 | 2/2019 | Salunke et al. | |
| 10,210,036 B2 | 2/2019 | Iyer et al. | |
| 10,210,038 B2 | 2/2019 | Sasturkar et al. | |
| 10,289,473 B2 | 5/2019 | Mendes et al. | |
| 10,397,810 B2 | 8/2019 | Yang et al. | |
| 10,489,363 B2 | 11/2019 | Yang et al. | |
| 10,515,079 B2 | 12/2019 | Chamarajnagar | |
| 10,637,744 B2 | 4/2020 | Carroll et al. | |
| 10,686,681 B2 | 6/2020 | Medas et al. | |
| 10,708,344 B1 | 7/2020 | Zhao et al. | |
| 10,715,391 B2 | 7/2020 | Rahman et al. | |
| 10,771,313 B2 | 9/2020 | Tedaldi et al. | |
| 10,867,036 B2 | 12/2020 | Komarek et al. | |
| 11,032,303 B1 | 6/2021 | Efstathopoulos et al. | |
| 11,138,163 B2 | 10/2021 | Mdini | |
| 2004/0260694 A1 | 12/2004 | Chaudhuri et al. | |
| 2005/0003827 A1 | 1/2005 | Whelan | |
| 2005/0216241 A1 | 9/2005 | Entin et al. | |
| 2007/0055662 A1 | 3/2007 | Edelman et al. | |
| 2013/0097463 A1 | 4/2013 | Marvasti | |
| 2013/0110761 A1* | 5/2013 | Viswanathan | G06F 16/24578 706/52 |
| 2013/0262656 A1 | 10/2013 | Cao et al. | |
| 2015/0019916 A1 | 1/2015 | Kane | |
| 2016/0021173 A1 | 1/2016 | Tapia | |
| 2016/0072599 A1 | 3/2016 | Kariyappa et al. | |
| 2016/0183109 A1 | 6/2016 | Kiesekamp | |
| 2016/0241429 A1 | 8/2016 | Froehlich | |
| 2016/0253366 A1 | 9/2016 | Hsu et al. | |
| 2017/0004166 A1 | 1/2017 | Biem et al. | |
| 2017/0085456 A1 | 3/2017 | Whitner | |
| 2017/0147930 A1* | 5/2017 | Bellala | G06N 5/04 |
| 2017/0161131 A1 | 6/2017 | Noll | |
| 2017/0207948 A1 | 7/2017 | Ratakonda | |
| 2017/0302554 A1 | 10/2017 | Chandrasekaran et al. | |
| 2017/0331673 A1 | 11/2017 | Iyer | |
| 2018/0034685 A1 | 2/2018 | Naous | |
| 2018/0039555 A1 | 2/2018 | Salunke et al. | |
| 2018/0046926 A1* | 2/2018 | Achin | G06N 20/20 |
| 2018/0063142 A1 | 3/2018 | Ashiya et al. | |
| 2018/0219889 A1 | 8/2018 | Oliner et al. | |
| 2018/0276063 A1 | 9/2018 | Mendes | |
| 2018/0285685 A1 | 10/2018 | Singh | |
| 2018/0300737 A1* | 10/2018 | Bledsoe | G06Q 10/06395 |
| 2018/0308001 A1 | 10/2018 | Doddala et al. | |
| 2019/0102718 A1 | 4/2019 | Agrawal et al. | |
| 2019/0124099 A1* | 4/2019 | Matselyukh | H04L 43/16 |
| 2019/0132250 A1 | 5/2019 | Horn et al. | |
| 2019/0149396 A1 | 5/2019 | Zafer et al. | |
| 2019/0163551 A1 | 5/2019 | Cheriton | |
| 2019/0165988 A1 | 5/2019 | Wang | |
| 2019/0260764 A1 | 8/2019 | Limited. | |
| 2020/0059800 A1 | 2/2020 | Menon et al. | |
| 2020/0082013 A1* | 3/2020 | Triplet | G06K 9/00496 |
| 2020/0136891 A1 | 4/2020 | Mdini | |
| 2020/0167393 A1 | 5/2020 | Gottlob et al. | |
| 2020/0278972 A1 | 9/2020 | Zhou et al. | |
| 2021/0006453 A1 | 1/2021 | Dutta et al. | |
| 2021/0014107 A1 | 1/2021 | Mijumbi et al. | |
| 2021/0117863 A1 | 4/2021 | Soleimani et al. | |
| 2021/0110294 A1 | 5/2021 | Elewitz et al. | |
| 2021/0136098 A1 | 5/2021 | Stergioudis et al. | |
| 2021/0184958 A1 | 6/2021 | Kolar et al. | |
| 2021/0250222 A1 | 8/2021 | Boussac | |
| 2021/0385331 A1 | 12/2021 | Kovvali et al. | |

FOREIGN PATENT DOCUMENTS

| | | |
|---|---|---|
| EP | 3764592 A1 | 1/2021 |
| EP | 3849142 A1 | 7/2021 |
| EP | 3866395 A1 | 8/2021 |
| JP | 4721362 B2 | 4/2011 |
| WO | 2012113436 A1 | 8/2012 |
| WO | 2014040633 A1 | 3/2014 |
| WO | 2016169616 A1 | 10/2016 |
| WO | 2017172541 A1 | 10/2017 |
| WO | 2017220107 A1 | 12/2017 |
| WO | 2018188733 A1 | 10/2018 |

OTHER PUBLICATIONS

Pranab Ghosh, "Time Series Seasonal Cycle Detection with Auto Correlation on Spark" retrieved from: https://pkghosh.wordpress.com/2018/12/23/time-series-seasonal-cycle-detection-with-auto-correlation-on-spark/.

European Search Report for 19206600.69-1216 dated Apr. 29, 2020.

Non-Final Office Action, U.S. Appl. No. 16/659,874, dated Dec. 23, 2021, 17 pages.

Qu et al., Multilevel Pattern Mining Architecture for Automatic Network Monitoring in Heterogeneous Wireless Communication Networks, Jun. 2016, China communications 13, No. 7: 108-116, Sep. 2, 2016.

Wang et al., An Algorithm for Mining of Association Rules for the Information Communication Network Alarms Based on Swarm Intelligence, Hindawi Publishing Corporation, Mathematical Problems in Engineering, vol. 2014, Article ID 894205, 14 pages, Jan. 1, 2014 [Online], [retrieved on Feb. 12, 2021] Retrieved from the Internet <URL: https://www.hindawi.com/journals/mpe/2014/894205/abs/>.

(56) References Cited

OTHER PUBLICATIONS

Brauckhoff et al.,Anomaly extraction in backbone networks using association rules, Proceedings of the 9th ACM SIGCOMM conference on Internet measurement, pp. 28-34, Nov. 4, 2009, [Online], [retrieved on Feb. 12, 2021], Retrieved from the Internet <URL: https://hal.archives-ouvertes.fr/hal-00527139/document >.

Agrawal et al.,Mining association rules between sets of items in large databases, May 1993,in Proceedings of the 1993 ACM SIGMOD international conference on Management of data (SIGMOD '93). Association for Computing Machinery, New York, NY, USA, 207-216. [Online], [retrieved on Feb. 19, 2021], Retrieved from the Internet <URL: https://doi.org/10.1145/170035.170072>.

Azevedo et al., Comparing Rule Measures for Predictive Association Rules, in Machine Learning: ECML 2007, [Online], [retrieved on Feb. 2, 2021], Retrieved from the Internet <URL: https://doi.org/10.1007/978-3-540-74958-5_47>.

Van Melle et al., Rule-based expert systems: the EMYCIN experiments of the Stanford Heuristic Programming Project, Chapter 15, EMYCIN: A knowledge Engineer's Tool for Constructing Rule-Based Expert Systems, 1984, CUMINCAD. Addison Wesley, Reading, MA.

Chen et al., Failure Diagnosis Using Decision Trees, May 2004, in International Conference on Autonomic Computing, 2004. Proceedings. IEEE, 36-43 New York, NY, USA.

M. Demetgul, Fault diagnosis on production systems with support vector machine and decision trees algorithms, 2013, The International Journal of Advanced Manufacturing Technology 67, 9-12 (2013), 2183- 2194. ISBN: 0268-3768, Springer Verlag. Nov. 23, 2012.

Gardner et al., Alarm correlation and network fault resolution using the Kohonen self-organising map., GLOBECOM 1997. IEEE Global Telecommunications Conference. Conference Record, vol. 3. IEEE, 1398-1402. IEEE, Phoenix, AZ.

Han et al., Mining Frequent Patterns without Candidate Generation: A Frequent-Pattern Tree Approach. Data Mining and Knowledge Discovery 8, 1 (Jan. 2004), 53-87.,[Online], [retrieved on Feb. 9, 2021], Retrieved from the Internet <URL: https://doi.org/10.1023/B:DAMI.0000005258.31418.83>.

Leskovec et al., Mining of Massive Datasets (2nd ed.), 2014, Cambridge University Press, USA.

Lin et al., Fast Dimensional Analysis for Root Cause Investigation in a Large-Scale Service Environment, Proceedings of the ACM on Measurement and Analysis of Computing Systems 4, 2 (Jun. 2020), 1-23., arXiv: 1911.01225 version: 2. [Online], [retrieved on Feb. 2, 2021] Retrieved from the Internet <URL: https://doi.org/10.1145/3392149>.

Perri et al. Abductive logic programs with penalization: semantics, complexity and implementation, arXiv preprint cs/0310047 (2003). Theory and Practice of Logic Programming 5, 1-2 (2003), 123-159.

Sampath et al. Failure diagnosis using discrete-event models. IEEE transactions on control systems technology 4, 2 (1996), 105-124. ISBN: 1063-6536 Publisher: IEEE.

Tan et al., Introduction to Data Mining, (First Edition). Addison-Wesley Longman Publishing Co., Inc., USA. A fault analysis framework for cellular networks using scalable association rule mining KDD '21, Aug. 14-18, 2021, Singapore, NY.

Hermann Wietgrefe, Investigation and practical assessment of alarm correlation methods for the use in GSM access networks, NOMS 2002. IEEE/IFIP Network Operations and Management Symposium. 'Management Solutions for the New Communications World' (Cat.No. 02CH37327). IEEE, 391-403. ). IEEE, Florence, Italy.

Ye et al., Board-level functional fault diagnosis using multikernel support vector machines and incremental learning. IEEE Transactions on Computer-Aided Design of Integrated Circuits and Systems 33, 2 (2014), 279-290. ISBN: 0278-0070 Publisher: IEEE.

Zawawy et al., Requirements-driven root cause analysis using Markov logic networks. In International Conference on Advanced Information Systems Engineering. CAiSE 2012, LNCS 7328, pp. 350-365, 2012, Springer-Verlag Berlin Heidelberg 2012.

Brin et al., Dynamic Itemset Counting and Implication Rules for Market Basket Data. SIGMOD 1997 Arizona USA, Rec. 26, 2 (Jun. 1997), 255-264.

Alzira Faria, A Methodology for Filtering Association Rules. Revista de Ciências da Computação II, 2 (Jan. 2007), 14-25.

Alipio Jorge, Hierarchical Clustering for thematic browsing and summarization of large sets of Association Rules, 2004 SIAM International Conference on Data Mining, Orlando, Florida.

Shvachko et al., The hadoop distributed file system. In Symposium on mass storage systems and technologies (MSST). IEEE, Incline Village, NV, USA, 1-10, 2010.

Zaharia et al., Spark: Cluster computing with working sets. In Proceedings of the 2nd USENIX Conference on Hot Topics in Cloud Computing (HotCloud'10), vol. 10. USENIX Association, USA, 2010.

Toivonen et al.. Pruning and Grouping Discovered Association Rules,1995, Department of computer Science, University of Helsinki, Finland.

Tan et al., Selecting the right objective measure for association analysis. Information Systems 29, 4 (2004), 293-313., Elsevier, Department of Computer Science, University of Minnesota, 200 Union Street SE, Minneapolis, MN 55455, USA.

Kam Rupesh Raj et al., Dynamic Autoselection and Autotuning of Machine Learning Models for Cloud Network Analytics, DOI 10.1109/TPDS.2018.2876844, IEEE Transactions on Parallel and Distributed Systems, vol. 30, Issue: 5, May 1, 2019, pp. 1052-1064, Oct. 19, 2018.

European Search Report for 19205083.9-1216 / 3648406 dated May 20, 2020.

Midini, Maha Anomaly Detection and Root Cause Diagnosis in Cellular Networks, Oct. 2, 2019, retrieved from https//tel.archives-ouvertes.fr/tel-02304602.

Midini, Maha et al., ARCD: a Solution for Root Cause Diagnosis in Mobile Networks, 2018 14th International Conference on Network and Service Management (CNSM), Nov. 5, 2018, pp. 280-284.

Midini, Maha et al., Introducing an Unsupervised Automated Solution for Root Cause Diagnosis in Mobile Networks, IEEE Transactions on Network and Service Management, IEEE, USA, vol. 17, No. 1, Mar. 2020, pp. 547-561.

Mdini, Create your own Artificial Intelligence to monitor your Linux System! Europython, Edinburg Jul. 23-29, 2018.

Mdini et al., Monitoring the Network Monitoring System: Anomaly Detection using Pattern Recognition, May 2017, IMT Atlantique, Astellia, France.

Office Action for U.S. Appl. No. 17/172,472 dated Jun. 28, 2022, 26 pages.

3GPP, 3rd Generation Partnership Project;Technical Specification Group Services and System Aspects; Telecommunication management; Charging management; Charging Data Record (CDR) parameter description Release 15), Dec. 2018, TS 32.298 V15.5.1.

Decker et al., Classification in Marketing Research by Means of LEM2-generated Rules, 2007, Department of Business Administration and Economics, Bielefeld University, Germany.

Dimopoulos et al., Identifying the Root Cause of Video Streaming Issues on Mobile Devices, Dec. 1-4, 2015, DOI: http://dx.doi.org/10.1145/2716281.2836109, Heidelberg, Germany.

E. J. Khatib, Data analytics and knowledge discovery for root cause analysis in LTE self-0rganizing networks, PhD dissertation, 2017, University of Malaga.

Fortes et al., Context-Aware Self-Healing: User Equipment as the Main Source of Information for Small-Cell Indoor Networks, Feb. 24, 2016, IEEE vehicular technology magazine, DOI: 10.1109/MVT.2015.2479657, IEEE.

Fortes et al., Contextualized indicators for online failure diagnosis in cellular networks, Apr. 4, 2015, Computer Networks 82 (2015) 96-113, Elsevier B.V., Spain.

Fortes et al., Location-based distributed sleeping cell detection and root cause analysis for 5G ultra-dense networks 2016, 2016:149, DOI 10.1186/s 13638-016-0649-6, EURASIP Journal on Wireless Communications and Networking.

Gogoi et al., Efficient Rule Set Generation using Rough Set Theory for Classificationof High Dimensional Data, 2011 International

(56) References Cited

OTHER PUBLICATIONS

Journal of Smart Sensors and Ad Hoc Networks (IJSSAN) ISSN No. 2248-9738 (Print) vol. 1, Issue-2.
Gomez-Andrades et al., Automatic Root Cause Analysis for LTE Networks Based on Unsupervised Techniques, Apr. 2016, IEEE Transactions on Vehicular Technology, vol. 65, No. 4, DOI: 10.1109/TVT.2015.2431742, IEEE.
Han J. and Kamber M. Data Mining Concepts and Techniques (second edition), 2006 by Elsevier Inc.
Hanemann, A Hybrid Rule-Based/Case-Based Reasoning Approach for Service Fault Diagnosis, available on May 13, 2019, Leibniz Supercomputing Center, Munich, Germany.
Imran et al., Challenges in 5G: Howto Empower SON with Big Data for Enabling 5G, Nov./Dec. 2014, EEE Network, IEEE.
Jin et al., Nevermind, the Problem is Already Fixed: Proactively Detecting and Troubleshooting Customer DSL Problems, Nov. 30-Dec. 2010, ACM 1-4503-0448-1/10/11, Philadelphia, USA.
Khatib et al., Data mining for fuzzy diagnosis systems in LTE networks, Jun. 1, 2015, Expert Systems with Applications 42 (2015) 7549-7559, Elsevier Ltd., Spain.
Klaine et al., A Survey of Machine Learning Techniques Applied to Self-Organizing Cellular Networks, Jul. 12, 2017, doi:10.1109/COMST.2017.2727878, IEEE Communications Surveysand Tutorials.
Leifler, Comparison of LEM2 and a Dynamic Reduct Classification Algorithm, Masters Thesis, Oct. 9, 2002, LiTH-IDA-EX-02-93, Artificial Intelligence & Integrated Computer Systems Division, Dept. of Computer and Information Science, Linkopings universitet.
Liu aet al. Integrating Classification and Association Rule Mining, From: KDD-98 Proceedings. Copyright © 1998, American Association for Artificial Intelligence (www.aaai.org). Department of Information Systems and Computer Science National University of Singapore.
Liu et al., GA-AdaBoostSVM classifier empowered wireless network diagnosis, 2018, 2018:77, https://doi.org/10.1186/s13638-018-1078-5 EURASIP Journal on Nireless Communications and Networking.
Maha Mdini, Gwendal Simon, Alberto Blanc, and Julien Lecoeuvre, Introducing an Unsupervised Automated Solution or Root Cause Diagnosis in Mobile Networks, IEEE Transactions on Network and Service Management, vol. 17, No. 1, Mar. 2020.
Mahapatro et al., Fault Diagnosis in Wireless Sensor Networks: A Survey, 2013, IEEE Communications Surveys & Tutorials, vol. 15, No. 4, DOI: 10.1109/SURV.2013.030713.00062, IEEE.
Mahimkar et al, Towards Automated Performance Diagnosis in a Large IPTV Network, Aug. 17-21, 2009, ACM 978-1-60558-59409/09/08, Barcelona, Spain.
Mahimkar et al., Rapid Detection of Maintenance Induced Changes in Service Performance, Dec. 6-9, 2011, ACM 978-1-4503-1041-3/11/0012, Tokyo, Japan.
Maimon, O and Rokach L. Data Mining and Knowledge Discovery Handbook (second edition) Springer Science+Business Media, LLC 2005, 2010. DOI 10.1007/978-0-387-09823-4.
Mdini M., Root Cause Diagnosis, Nov. 22, 2017, Astellia.
Mdini, Anomaly detection and root cause diagnosis in cellular networks. Artificial Intelligence [cs.AI]. Ecole nationale superieure Mines-Telecom Atlantique, 2019. English. NNT: 2019IMTA0144. tel-02304602.
Mdini, Maha, Monitoring the Network Monitoring System: Anomaly Detection using Pattern Recognition, Cellular Networks Feb. 22, 2017.
Mi et al., Toward Fine-Grained, Unsupervised, Scalable Performance Diagnosis for Production Cloud Computing Systems, Jun. 2013, IEEE Transactions on Parallel and Distributed Systems, vol. 24, No. 6, DOI:10.1109/TPDS.2013.21, IEEE Computer Society.
Monge et al. Reasoning and knowledge acquisition framework for 5G network analytics, Oct. 21, 2017, Sensors.
Moysen et al., A Reinforcement Learning based solution for Self-Healing in LTE networks, 2014, 978-1-4799-4449-1/14, IEEE.
Munoz et al., A method for identifying faulty cells using a classification tree-based UE diagnosis in LTE, 2017, 2017:130, DOI 10.1186/s13638-017-0914-3, EURASIP Journal on Wireless Communications and Networking.
Nagaraj et al., Structured Comparative Analysis of Systems Logs to Diagnose Performance Problems, available May 23, 2019, Purdue University.
Ong et al., A Manufacturing Failure Root Cause Analysis in Imbalance Dataset Using PCA Weighted Association Rule Mining, Aug. 11, 2015, Penerbit UTM Press, Melaka, Malaysia.
Palacios et al., Automatic feature selection technique for next generation self-organizing networks, IEEE Communications Letters, vol. 22, No. 6, Jun. 2018. Digital Object Identifier 10.1109/LCOMM.2018.2825392.
Palacios et al., Combination of multiple diagnosis systems in Self-Healing networks, Jul. 22, 2016, Expert Systems With Applications 64 (2016) 56-68, Elsevier Ltd., Spain.
Reali G. and Monacelli L., Definition and Performance Evaluation of a Fault Localization Technique foran NGN IMS Network, IEEE Transactions on Network and Service Management, vol. 6, No. 2, Jun. 2009. DOI 10.1109/TNSM.2009.090605. Downloaded on Jan. 31, 2022 at 20:51:52 UTC from IEEE Xplore.
Steinder et al., A survey of fault localization techniques in computer networks, Jul. 1, 2004, Science of Computer Programming 53 (2004) 165-194, United States.
Tan et al., Introduction to Data Mining, Pearson New International Edition (First Edition). Pearson Education Limited 2014 ISBN 10: 1-292-02615-4 ISBN 13: 978-1-292-02615-2.
Van Melle W., Rule-based expert systems: the MYCIN experiments of the Stanford Heuristic Programming Project, Chapter 4, The Structure of the MYCIN System, 1984, CUMINCAD. Addison Wesley, Reading, MA.
Xu et al., Industrial Big Data for Fault Diagnosis: Taxonomy, Review, and Applications, Sep. 19, 2017, IEEE Access, vol. 5, DOI: 10.1109/ACCESS.2017.2731945, IEEE.
Zhang et al, On Assuring End-to-End QoE in Next Generation Networks: Challenges and a Possible Solution, Jul. 2011, 0163-6804/10, IEEE Communications Magazine.
Zheng et al., 3-Dimensional Root Cause Diagnosis via Co-analysis, Sep. 18-20, 2012, ACM 978-1-4503-1520-3/12/09, San Jose, USA.
H. Phan-Vu, B. Jaumard, T. Glatard, J. Whatley and S. Nadeau, "A Scalable Multi-factor Fault Analysis Framework for Information Systems," in 2021 IEEE International Conference on Big Data (Big Data), Orlando, FL, USA, 2021 pp. 2621-2630. doi: 10.1109/BigData52589.2021.9671747.
E. Cuthill and J. McKee, Reducing the bandwidth of sparse symmetric matrices, ACM '69: Proceedings of the 1969 24th national conference, Aug. 1969, pp. 157-172.
Rodriguez-Perez Raquel et al: "Interpretation of machine learning models using shapley values: application to compound potency and multi-target activity predictions" Journal of Computer-Aided Molecular Design, Springer Netherlands, NL, vol. 34, No. 10, May 2, 2020 (May 2, 2020), pp. 1013-1026, XP037228335, ISSN: 0920-654X, DOI: 10.1007/S10822-020-00314-0 [retrieved on May 2, 2020].
Rohit Saluja et al: "Towards a Rigorous Evaluation of Explainability for Multivariate Time Series", Arxiv.org, Cornell University Library, 201 Olin Library Cornell University Ithaca, NY 14853, Apr. 6, 2021 (Apr. 6, 2021), XP081936276.
Office Action in U.S. Appl. No. 17/835,467 dated Jan. 4, 2023.

\* cited by examiner

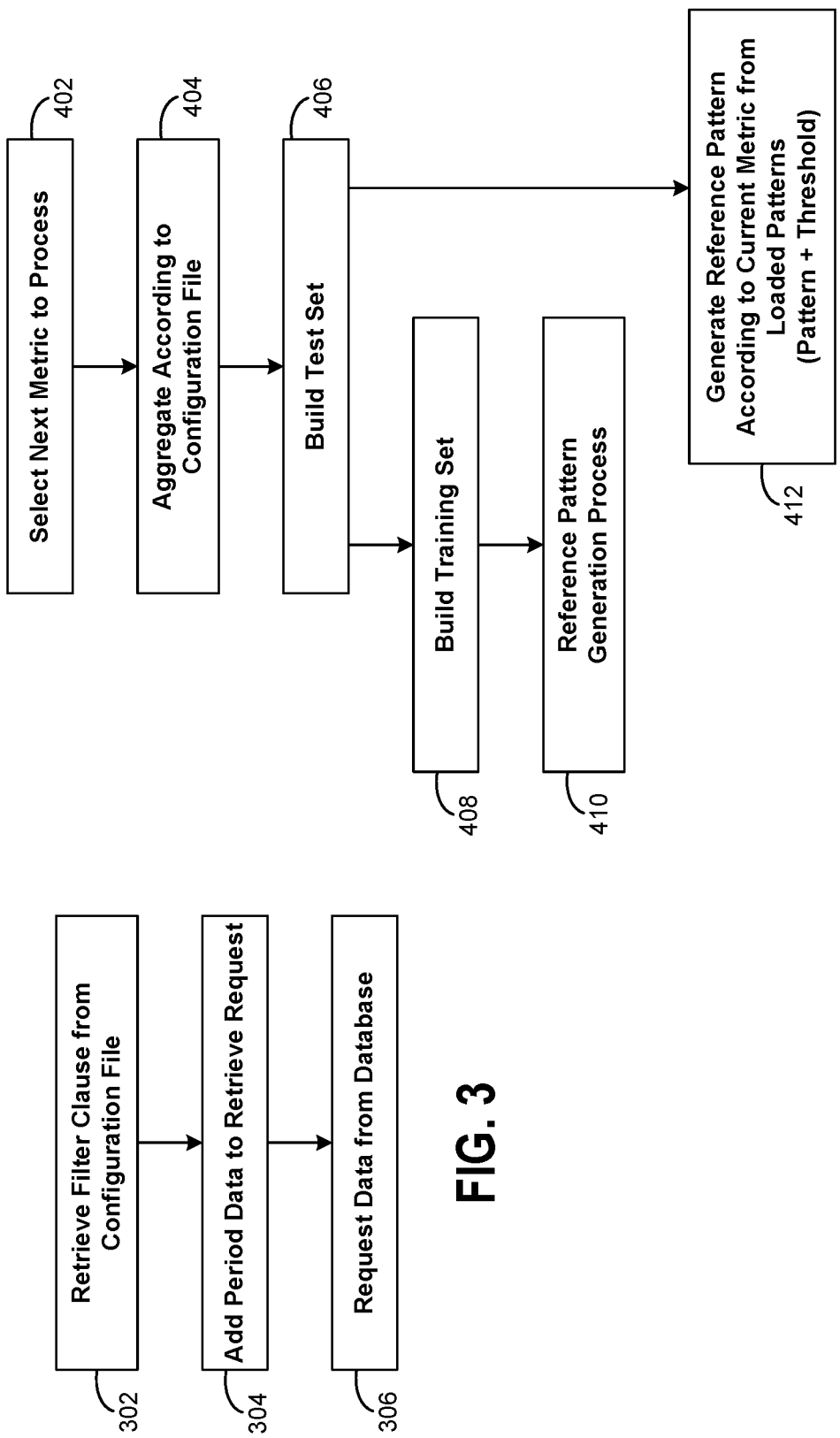

ANOMALY DETECTION IN BIG DATA TIME SERIES ANALYSIS

CROSS-REFERENCE TO RELATED APPLICATIONS

This application claims priority under 35 U.S.C. § 119(e) to U.S. Provisional Patent Application Ser. No. 62/777,887, filed on Dec. 11, 2018, which is incorporated herein in its entirety by reference.

BACKGROUND

Anomaly detection in time series is a known problem in the field of computer science, and may be applicable to a range of problems in which time series data are generated and/or collected via observations or measurements of temporal processes. Certain aspects of anomaly detection may rely on data sampled over long time scales compared with sampling intervals between data samples (e.g., measured values that make up the time series data). In such cases, the large statistics afforded by the long-term collection of data may help in a signal-to-noise sense. However, evolutionary trends in the data, or shorter term variation, may be washed out or diluted. The tradeoff between utilizing too little data and too much data may therefore present a challenge to reliable anomaly detection.

Among previously proposed approaches to anomaly detection is a so-called Watchmen Anomaly Detection, referred to herein as the WAD algorithm. The WAD algorithm is described in "Monitoring the Network Monitoring System: Anomaly Detection using Pattern Recognition" by Maha Mdini et al., published in May 2017 on pages 983 to 986 of the Proceedings of the IFIP/IEEE Symposium on Integrated Network and Service Management (IM) in Lisbon.

SUMMARY

Part of the WAD algorithm entails determining a reference model against which time series data may be compared. Although the WAD algorithm has been shown to be a fairly reliable tool for anomaly detection in some cases, the inventor has discovered through various test runs that determination of a reference model in the form of a daily pattern and a corresponding threshold during its learning phase may be improved to yield better accuracy. In particular, the inventor has devised an analytical approach that provides for an improved reference model for use in the WAD algorithm.

Accordingly, the present disclosure addresses the need for an improved reference model determination, and provides techniques for achieving the improvement.

A first example embodiment may involve a computer-implemented method for detecting anomalies in time series data, the method configured for operation in a computing system, and comprising: obtaining training time series data from a production database, the training time series data spanning an observation time window and comprising a series of values of a metric at regularly-spaced sample points in time, the regular spacing equal to an inter-sample time interval; analyzing the training time series data to determine one of a periodicity or a pseudo-periodicity of the training time series data across a plurality of consecutive, repeating sub-windows that span the observation time window, each equal in size to a reference time period and each spanned by the same number N of sample points of metric values, wherein N is a positive integer greater than one; determining a reference pattern comprising a series of N sample points of reference values spanning the reference time period and separated from one another by the inter-sample time interval, the reference pattern corresponding to a model time series having no anomalies greater than a threshold anomaly with respect to the periodicity or pseudo-periodicity; determining a reference threshold; storing the reference pattern and the reference threshold in a reference database; obtaining runtime time series data from the production database, the runtime time series data spanning a runtime observation widow equal to the reference time period, and comprising runtime values of the metric at N sample points in time, separated from one another by the inter-sample time interval; time aligning the N sample points of the reference pattern with the N sample points of runtime observation window; computing runtime deviations between the runtime values and the reference values of the reference pattern at each of the N time aligned sample points; identifying each of zero or more runtime deviations having an absolute value that exceeds the reference threshold as an anomaly; and graphically displaying each identified anomaly and its corresponding sample time in a display device of the computing system.

A second example embodiment may involve a system configured for detecting anomalies in time series data, the system comprising: one or more processors; and memory configured for storing instructions that, when executed by the one or more processors, cause the system to carry out operations including: obtaining training time series data from a production database, the training time series data spanning an observation time window and comprising a series of values of a metric at regularly-spaced sample points in time, the regular spacing equal to an inter-sample time interval; analyzing the training time series data to determine one of a periodicity or a pseudo-periodicity of the training time series data across a plurality of consecutive, repeating sub-windows that span the observation time window, each equal in size to a reference time period and each spanned by the same number N of sample points of metric values, wherein N is a positive integer greater than one; determining a reference pattern comprising a series of N sample points of reference values spanning the reference time period and separated from one another by the inter-sample time interval, the reference pattern corresponding to a model time series having no anomalies greater than a threshold anomaly with respect to the periodicity or pseudo-periodicity; determining a reference threshold; storing the reference pattern and the reference threshold in a reference database; obtaining runtime time series data from the production database, the runtime time series data spanning a runtime observation widow equal to the reference time period, and comprising runtime values of the metric at N sample points in time, separated from one another by the inter-sample time interval; time aligning the N sample points of the reference pattern with the N sample points of runtime observation window; computing runtime deviations between the runtime values and the reference values of the reference pattern at each of the N time aligned sample points; identifying each of zero or more runtime deviations having an absolute value that exceeds the reference threshold as an anomaly; and graphically displaying each identified anomaly and its corresponding sample time in a display device of the system.

In a third example embodiment provides an article of manufacture including a non-transitory computer-readable medium, having stored thereon program instructions that, when executed by one more processors of a system for detecting anomalies in time series data, cause the system to carry out operations including: obtaining training time series data from a production database, the training time series data spanning an observation time window and comprising a series of values of a metric at regularly-spaced sample points in time, the regular spacing equal to an inter-sample time interval; analyzing the training time series data to determine one of a periodicity or a pseudo-periodicity of the training time series data across a plurality of consecutive, repeating sub-windows that span the observation time window, each equal in size to a reference time period and each spanned by the same number N of sample points of metric values, wherein N is a positive integer greater than one; determining a reference pattern comprising a series of N sample points of reference values spanning the reference time period and separated from one another by the inter-sample time interval, the reference pattern corresponding to a model time series having no anomalies greater than a threshold anomaly with respect to the periodicity or pseudo-periodicity; determining a reference threshold; storing the reference pattern and the reference threshold in a reference database; obtaining runtime time series data from the production database, the runtime time series data spanning a runtime observation widow equal to the reference time period, and comprising runtime values of the metric at N sample points in time, separated from one another by the inter-sample time interval; time aligning the N sample points of the reference pattern with the N sample points of runtime observation window; computing runtime deviations between the runtime values and the reference values of the reference pattern at each of the N time aligned sample points; identifying each of zero or more runtime deviations having an absolute value that exceeds the reference threshold as an anomaly; and graphically displaying each identified anomaly and its corresponding sample time in a display device of the system.

In a fourth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 3 is a flow chart illustrating an example of data filtering used in an example anomaly detection process, in accordance with example embodiments.

FIG. 4 is a flow chart illustrating an example of data aggregation used in an example anomaly detection, in accordance with example embodiments.

DETAILED DESCRIPTION

Figure 1:
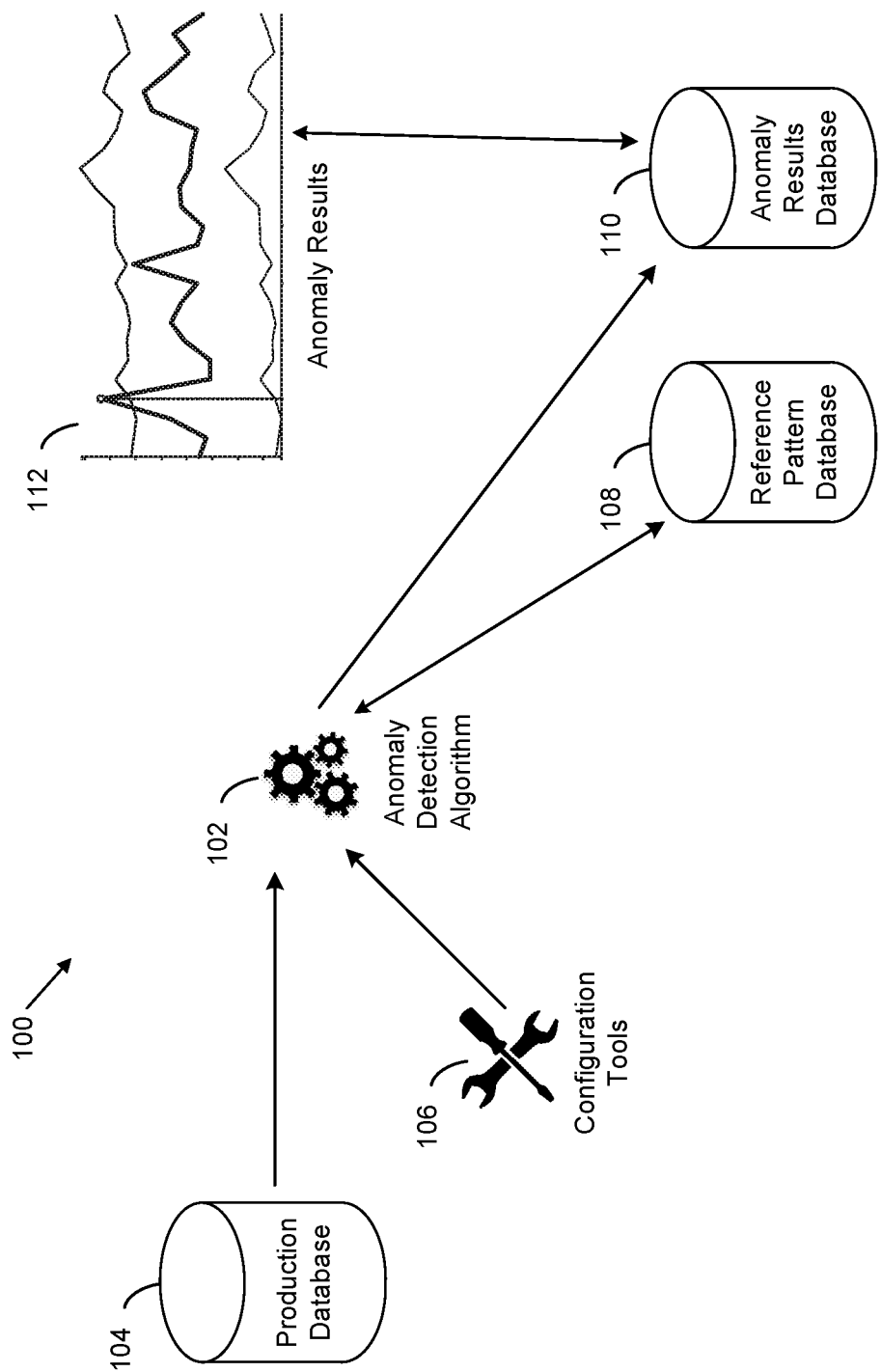
FIG. 1 is a conceptual representation of an anomaly detection system 100 in which an anomaly detection algorithm may be implemented in a distributed Big Data environment, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. EXAMPLE ANALYTICAL FORMULATION AND IMPLEMENTATION

A. Overview

Analyzing time series data for anomalies presents a number of challenges when the sources of the data are collectively stored in Big Data distributed file system. Such data may not only be voluminous in terms of the amount of information represented, but also diverse in terms of types or subtypes of data, and the variety of time scales of interest that may be represented. The time scales may apply to sampling intervals between individual time series measurements, collection intervals over which measurements are made or obtained, and periodicities of the samples over possibly multiple periods and/or pseudo-periods. In addition, there can be temporal evolution of periodic trends in the time series data. For example, there may be a persistent period of time series samples, while at the same time an underlying process that is subject to measurements represented in the samples evolves over a time scale much larger than the period. For such situations, long-term statistics that might otherwise enhance computational accuracy could wash dilute or wash out the long-term evolution. These and other factors are addressed by example embodiments of systems and methods for anomaly detection of time series data described herein.

As used here, the term "Big Data" refers to the use of advanced data analytics methods to extract useful information from large amounts of data stored in databases. The term Big Data may in particular apply to the use of inductive statistics and concepts to infer laws from large sets of data with low information density to reveal relationships and dependencies, as well as to perform predictions of outcomes and behaviors. By way of example, anomaly detection methods and computer systems disclosed herein are described using an example embodiment deployed on a Big Data Hadoop system. It should be understood that this example implementation is presented for illustrative purposes, and should not be seen a limiting with respect to the described embodiments or alternative embodiments.

In accordance with example embodiments, a method of detecting an anomaly in one or more periodic time series may be implemented in a computing device or computing system. By way of example some or all of the example method could be implemented in a software language, such as Java Spark. However, the method could be implemented in other software languages and/or machine instructions.

Each time series may reflect temporal variation of a specific metric, such as call attempts in a telecommunications system or financial transactions in a global banking system. The time series may be collectively stored in one Big Data distributed file system. The method may entail steps and operations aimed at accommodating the size and variety of stored data, as well as accounting for a variety of time scales represented in the data. In an example embodiment, a user may engage in the example method through a user interface of the system, causing the system to carry out operations involving configuration of operational parameters of the method, as well as providing the user with analytical results for evaluation and further analyses.

More particularly, an example method may entail obtaining user preferences in the form of a set of configuration parameters, and then fixing the value of each configuration parameter according to user preferences. With user preferences set, anomaly detection may then entail detecting an update of at least one the time series in the Big Data distributed file system, and obtaining, for each updated time series, the update from the Big Data distributed file system and a periodic reference pattern from a reference pattern database. As described below, each periodic reference pattern may be generated using an unsupervised pattern recognition algorithm, such as the WAD algorithm. Next a sample-by-sample deviation of each update from its corresponding periodic reference pattern may be determined, followed by comparing each deviation with a corresponding predetermined threshold. Finally signaling an anomaly may be signaled in each time series for which the deviation exceeds the corresponding predetermined threshold.

In accordance with example embodiments, the set of configuration parameters may include: a place of storage of the time series in the Big Data distributed file system; an identity of each time series where an anomaly is to be detected; the type of preprocessing, such as filtering and aggregation, to be performed on the time series prior to said anomaly detection steps; a type of mathematical technique, such as percentile or regression analysis, used for determination of a threshold; a type of computation, such as mean value calculation or median value calculation, used for the generation of a periodic reference pattern; a type of computation, such as mean value calculation or median value calculation, used for the generation of a periodic reference pattern; temporal parameters used for the generation of a periodic reference pattern; and a type of mathematical transform, if any, to be used for the generation of a periodic reference pattern. Other and/or additional configuration parameters could be included as well.

By way of example, a Big Data distributed file system may be a Hadoop distributed file system or HDFS. However, other types of Big Data distributed files systems could be used as well. In accordance with example embodiments, the periodic reference pattern may span a reference time period equal to the periodicity of the time series data. Non-limiting examples of the period include one day, one week, and one month. These examples could be relevant to monitored events in a telecommunications system, for example. It will be appreciated that example embodiments are not limited by any particular or specific time period specification.

In an example embodiment, the unsupervised pattern recognition algorithm may involve the use of a Difference over Minimum or DoM transform. As noted, the one or more time series may reflect the temporal variation of a metric characterizing the behavior of a telecommunications network. However, time series data may represent other temporal process as well. In addition, the predetermined threshold may be time-dependent. In further accordance with example embodiments, the example method may involve correlating several time series to obtain a combined key performance indicator of an operational system.

In accordance with example embodiments, a distributed Big Data processing computer system configured to execute the example method as defined above.

Also in accordance with example embodiments, a method of detecting an anomaly in a periodic or pseudo-periodic sample time series may be implemented in a computing device or computing system. The periodic or pseudo-periodic sample time series may reflect measured temporal variation of a specific metric over a fixed reference time period after which the specific metric's temporal variation is known to essentially repeat itself. The sample time series may consist of a series of values of the metric measured or obtained at consecutive sample points in time separated from each other by a regular sample time interval. The example method may entail one phase involving reference model generation, and another phase involving anomaly detection.

The reference model generation phase may include operations including obtaining a training time series that represents temporal variation of the specific metric over a length of time, referred to herein as an observation time window, corresponding to an integer multiple of the fixed reference time period. For practical mathematical reasons explained below, the observation time window should span at least three reference time periods. The training times series should consist of a series of values of the metric at consecutive points in time separated by regular sample time interval. In accordance with example embodiments, obtaining the training time series data may also entail filtering and/or aggregating multiple sources of time series data in the Big Data distributed file system. For example, for telecommunications data representing operations relating to network service delivery, filtering could be used to select service type, such as voice call attempts, content streaming requests, or data session setup. Aggregation could include aggregating data over regions or subregions of a network, or aggregating data over service types. These are just a few examples.

A next step may entail confirming that the training time series has a periodicity corresponding to the fixed reference time period. A periodic reference pattern based on the training time series may then be generated (or possibly obtained from a database). In accordance with example embodiments, the periodic reference pattern may itself be a reference time series over the fixed reference time period that models anomaly-free behavior of the metric over the fixed reference time period. Generation of the periodic reference pattern is described in more detail below. A reference threshold based on the training time series may also be determined in order to later evaluate deviations between time series data and the periodic reference pattern.

In accordance with example embodiments, determination of the reference threshold may entail dividing the training time series into a plurality of consecutive subsets, each subset spanning one fixed reference time period and consisting of a series of N values $V_i$, i=1, ..., N, of the metric at consecutive sample points in time separated by the regular sample time interval, wherein N is a natural number. Again, the number of subsets may be at least three. Next, each subset may be time-aligned with the periodic reference pattern, and at each sample point, a deviation between the metric value and the reference pattern may be computed. Each deviation may then be stored in one or another form of memory. Next, a deviation sequence may be constructed as a sequence of deviations ranked according to deviation size, from smallest to largest. The deviation sequence may then be represented as or fit with a curve, and the slope of the curve estimated as a function of deviation sequence rank. The deviation for which the slope of the curve is largest, while still remaining below a predetermined slope upper limit may then be identified as the reference threshold. In accordance with example embodiments, the slope may be determined using piecewise linear regression. The periodic reference pattern, in the form of a time series of reference points, together with the reference threshold, may finally be stored in a reference model database as a reference model for use in anomaly detection.

The anomaly detection phase may include obtaining a runtime time series data to be tested, determining deviations between the runtime time series and the reference model, and identifying any deviation that exceeds the threshold as an anomaly.

In accordance with example embodiments, generation of a periodic reference model may entail subdividing training time series data spanning an observation time window into a plurality of subsets, each corresponding to a reference time period over which the training time series exhibits periodicity, and time aligning the subsets with a common reference time. At each sample point of the aligned subsets, a statistical measure of the aligned sample time series values is computed and used to define a reference value of a reference pattern. Further details are presented in the following paragraphs.

A training time series is first obtained. The training time series may represent temporal variation of the specific metric over a length of time corresponding to the observation time window, and including an integer number n of the fixed reference time period, again n being at least three in an example embodiment. The training times series may consist of a series of values of the metric at consecutive points in time separated by the regular sample time interval. The periodicity of the training time series may be confirmed, for example by apply a fast Fourier transform (FFT). In another example, confirming periodicity may involve confirming that the average value of the training time series is different from zero. The training time series may then be subdivide into the integer number of consecutive subsets, where each subset spans one fixed reference time period and consists of a series of N values $V_i$, i=1, ..., N, of the metric at consecutive sample points in time separated by the regular sample time interval, wherein N is a natural number.

All of the subsets are then time-aligned with a common reference time, such that there are n metric values at each sample point of the time-aligned subsets. At each sample point, a median value $M_i$ is determined from the n metric values. At each sample point the value $M_i$ is taken to be a reference time series value, and the set of $M_i$, i=1, ..., N, is taken to define the periodic reference pattern. The reference threshold is then determined as described above, and both the periodic reference pattern and the threshold are stored as a reference model in a reference model database.

The anomaly detection phase may then be carried out as described above, and further discussed below.

In accordance with example embodiments, the fixed reference time period may be seven consecutive days, and in particular one week from Monday to Sunday, or a single day. Other reference time periods may be used as well. The number n may be equal to or greater than three. Again, the specific metric may characterize the behavior of one or more network components and/or one or more network subscribers of a telecommunications network, and the telecommunications network may be a mobile telecommunications network. The regular sample time interval may be one of 1 hour, 15 minutes, or 30 minutes. These values may be appropriate for monitoring certain events in a telecommunications network. Other values could be determined according to a particular application of the example method.

The example methods and systems described herein may be used to check for anomalies in any kind of time series that exhibits periodic or pseudo-periodic temporal behavior. This holds irrespective of the kind of metric whose temporal behavior the time series reproduces. The time series may, for example, represent the change in time of a stock market index, the time changes of the temperature of a liquid, or any other kind of metric having a periodic behavior in time.

By way of example, the example anomaly detection methods and systems are described herein as applied to traffic data generated by a telecommunications network. In one embodiment, the example anomaly detection methods and systems may be part of a mobile network monitoring system. The traffic data, which is monitored for anomalies, may be any kind of metric that is logged by the mobile network monitoring and analytics system. For example, the example anomaly detection methods and systems may look for anomalies in data contained in Call Data Records or CDRs. In one embodiment, the anomaly detection is performed in real time on data that is continually generated by the mobile telecommunications network.

B. Example System and Operation

FIG. 1 is a conceptual representation of an anomaly detection system 100 in which an anomaly detection algorithm may be implemented in a distributed Big Data environment, in accordance with example embodiments. As shown, the anomaly detection system 100 includes a production database 104, an anomaly detection algorithm 102, configuration tools 106, a reference pattern database 108, and an anomaly results database 110. Anomaly results 112 may be displayed in a display device, which may be part of a computing device or system in which the anomaly detection system 100 is implemented. The illustration in FIG. 1 is conceptual in the sense that the anomaly detection algorithm 102 and configuration tools 106 are represented as operational components. It should be understood, however, that these elements, as well as the implied display of the anomaly results 112, are implemented on a computing device or computing system, such as one described below. The purpose of the conceptual illustration is to focus on certain operational and procedural aspects of the example embodiments described herein.

The analytical core of the system 100 is the anomaly detection algorithm 102. In particular, this algorithm may be modeled on the WAD algorithm referred to above. In this sense, the anomaly detection algorithm may include a training phase, in which training time series data are used to generate a reference pattern that models anomaly-free behavior of the time series data. A threshold is also determined during the training phase. The anomaly detection algorithm may also include detection phase, in which deviations between runtime time series data are the reference model are evaluated using the threshold, in order to identify deviations that may be classified or identified as anomalies. While the WAD algorithm may incorporate training and detection phases, example embodiments of the anomaly detection algorithm 102 employed in the system 100 introduce significant improvements that make it more accurate and reliable in recognizing anomalies in time series data. These improvements are particularly advantageous in the modeling anomaly-free reference patterns and determining appropriate thresholds.

Another advantage of the system 100 is the capability it provides a user to configure various aspects of operation. In particular, the configuration tools 106, which may be implemented in a computing device and made available by a user interface, allow a user to set parameters that control filtering and aggregation of data to be used by the anomaly detection algorithm. In addition, parameters may be set that control time frames to be used for sliding time windows, sampling intervals of time series data, and periodicities to consider in the analyses, among other time scales.

In example embodiment, the anomaly detection algorithm 102 may be embedded in a Big Data environment. Operationally, anomaly detection algorithm 102 may fetch its data inputs from the production database 104. This database may for example contain data characterizing the traffic on a mobile telecommunications network, though other types of time series data may be stored.

The configuration tools 106 may enable a user to fix the values of a set of configuration parameters of the anomaly algorithm 102. The anomaly detection algorithm 102 uses a reference pattern database 108 for anomaly detection, and stores results of anomaly detection carried in the anomaly results database 110. It may also display anomaly results 112 as a graphical representation in a display device.

The configuration tool 106 may also allow a user to change various settings of the anomaly detection algorithm 102. The settings chosen by the user may be stored in a configuration file. A sample configuration file is illustrated in Table 1.

TABLE 1

Databases location
hiveDatawareHouseURL=/user/hive/warehouse/astellia.db/
Spark generic configuration
sparkConfParam1=hive.execution.engine:mr
sparkConfParam2=hive.exec.dynamic.partition.mode:nonstrict
sparkConfParam3=hive.exec.dynamic.partition:true
sparkConfParam4=hive.exec.compress.output:true
ouptut storage type
outputType=orc
ouptut storage (should be same as hiveDatawareHouseURL)
outputPath=/user/hdfs__astellia/anomalydetect
database name for pattern storage
patternDatabaseName=anomaly__pattern__hour
database name for references of all patterns
referenceDatabaseName=anomaly__reference
granularity of database in input
timeGranularity=hour
pattern recognition periodicity
patternPeriod=week
pattern days for generate (if pattern period is week, should be a multiple of 7)
patternDaysDeep=21
optional day to test instead of last partition
dayToTest=year=2018/month=4/day=15
cube name for input
inputTableName=data__an__service__hour
database name for input cube
inputDatabaseName=inputDB
counters to check for anomaly
columnToAdd1=active__subs__nb
columnToAdd2=impacted__subs__nb
list of cube dimensions
inputDimension1=rat
inputDimension2=sqm__service__id
inputDimension3=id__saicluster
list of group by dimensions for extraction request
groupByDimension1=id__saicluster
groupByDimension2=sqm__service__id
where clause for cube extraction
whereClause=id__saicluster=0 and sqm__service__id=1 and rat=0
threshold for FFT (periodicity check)
fftThreshold=93
threshold for percentile used for anomaly check
patternThreshold=99

Using the configuration tool 106, a user may set parameters and make selections, such as:
Choose the source of the data that is to be analyzed for anomalies;
Set a system configuration;
Choose the metrics within the data which are to be checked for anomalies;
Choose the kind of filtering and/or aggregation, if any, to be applied to the data prior to the actual anomaly detection;
Define correlations between metrics to obtain a combined key performance indicator;

Choose the type of mathematical technique, such as percentile and/or regression analysis, used for the determination of a threshold used in anomaly detection;

Choose the type of calculation, such as mean value calculation or median value calculation used for the generation of a periodic reference pattern;

Choose the value of temporal parameters used for the generation of a periodic reference pattern;

Choose a type of mathematical transform, if any, to be used for the generation of a periodic reference pattern.

FIGS. 2-7 are flow charts show example operation of various aspects of the anomaly detection system 100, showing successive levels of detail. FIG. 8 illustrates the concept of applying the reference pattern in to a test time series signal to detect anomalies. Each of these figures is discussed below. In accordance with example embodiments, an example method of the present disclosure may be configured to detect anomalies in the time series signal of different metrics.

Figure 2:
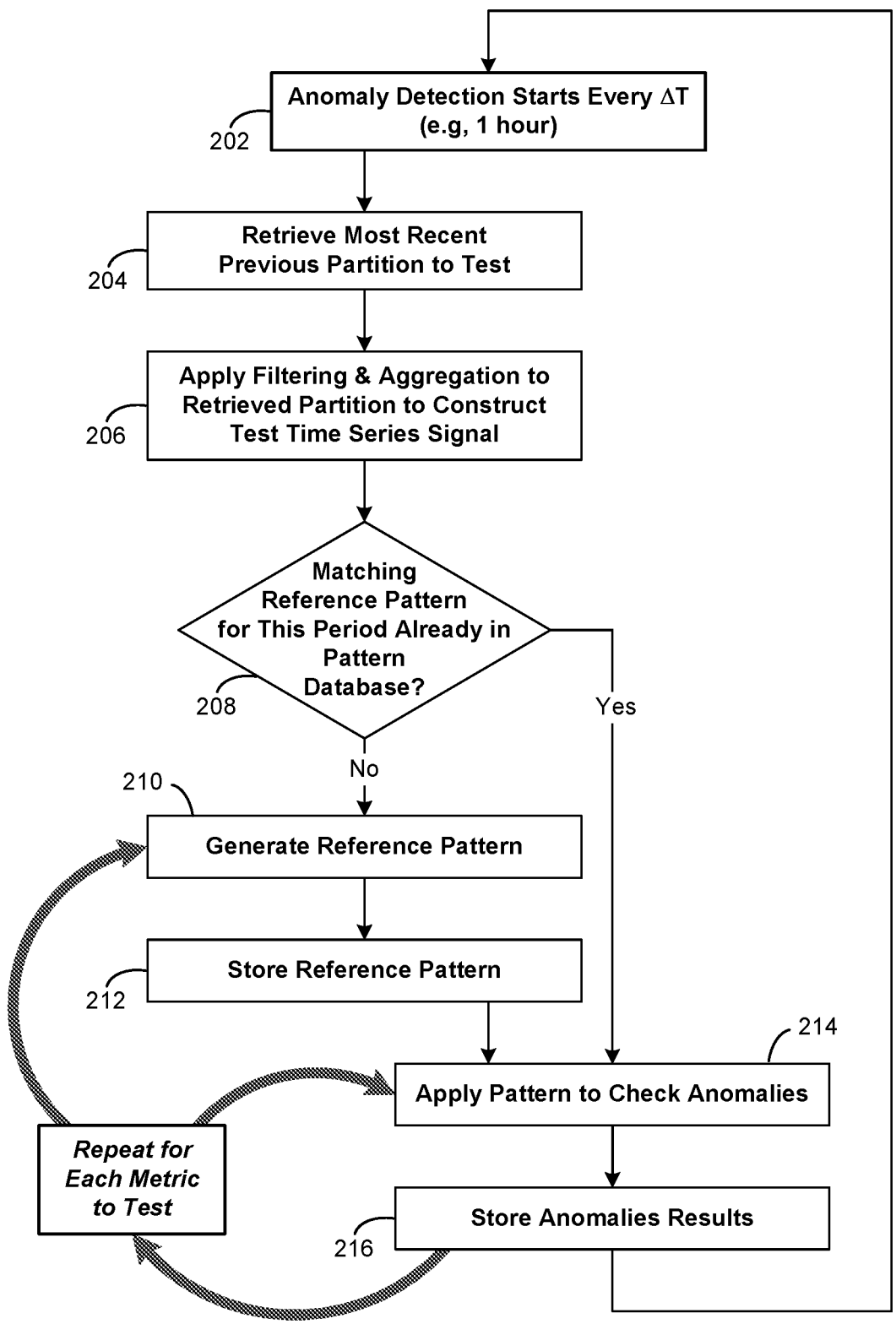
FIG. 2 is a flow chart of high-level view of an example the anomaly detection process, in accordance with example embodiments.

FIG. 2 is a flow chart of high-level view of an example the anomaly detection process, in accordance with example embodiments.

By way of example, a use case involving a bank client has five different bank accounts with a specific bank may serve to illustrate operation of the anomaly detection algorithm, including improvements described herein, in the context of a Big Data environment. In accordance with example embodiments, the anomaly detection method of the present disclosure, applied in the illustrative use case, may be used to detect anomalies in the temporal evolution of the balance of each one of the five bank accounts. The temporal evolution of the balance of each bank account may be represented by a time series. These time series may each stored in the production database 104. Each of these time series may represent one metric that may be analyzed by the anomaly detection method of the present disclosure. In practice, the time series stored in the production database 102 may be continually updated, for example as new transactions occur.

The production database 104 may be part of a Big Data distributed file system, such as Hadoop distributed file system (HDFS).

Once the user has configured the anomaly detection algorithm 102 using the configuration tools 106, the process of the example method repeatedly executes a processing loop shown in FIG. 2, for example, on an hourly or some other regular basis. The repeating process represented in FIG. 2 may be applied in series or in parallel to each of possibly multiple sets of time series data, such multiple bank accounts.

The loop may initially start at step 202, which in the example of FIG. 2 also represents the start of subsequent, regular executions of the loop. From the stating step 202, the process proceeds to step 204, which involves retrieving data from the production database 104 for the most recent time window, such as the last one hour partition. More specifically, the latest hourly values of all the metrics stored in the production database 104 may be retrieved in step 204. The process then proceeds to 206, in which actual time series signals to be tested are constructed from the raw data retrieved in the last partition. In accordance with example embodiments, time series construction may involve filtering and aggregating the data. The filtering and aggregation may be determined according to configuration parameters previously set using the configuration tools 106.

Next, step 208 involves checking whether, for each time series to be analyzed, there is a matching reference pattern stored in the reference pattern database 108. If there is no matching reference pattern, the process proceeds to steps 210 and 212, in which a corresponding reference pattern is generated and stored in the reference pattern database 108. The checking step 208 may involve determining in an existing pattern is stale or out of date. For example, a configuration parameter may specify that an existing pattern is out of date if it was generated more than a specified time period ago, such as one day or one week. This could be associated with a sliding time window, for example. Including an expiration time for patterns enables pattern generation to accommodate evolution in the time series data.

If instead a reference pattern database 108 already contains a matching reference pattern, then the process proceeds to step 214, in which the matching reference pattern is used to check the time series signal for anomalies. The processing next proceeds to a final step of the loop, step 216, in which the anomalies found during step 214 are stored in anomaly results database 110. As indicated by the curved gray arrows in the figure, steps 210 to 216 are carried out for each metric under consideration.

Steps 210 and 212 may be considered as corresponding to the learning or training phase, which will be described more in detail below. Steps 214 and 216 may be considered as corresponding to the detection phase, also described in more detail below.

The filtering and aggregating carried out in step 206 are show in further detail in FIGS. 3 and 4. Specifically, FIG. 3 is a flow chart illustrating an example of data filtering used in an example anomaly detection process, in accordance with example embodiments, and FIG. 4 is a flow chart illustrating an example of data aggregation used in an example anomaly detection, in accordance with example embodiments.

Referring to FIG. 3, the filtering starts at step 302 with retrieving the filter setting selected by a user from the configuration file.

At step 304, a retrieval request may be formulated based on the filter setting. The relevant time period for consideration during anomaly detection may be added to the data retrieval request. For example, the period may be one hour. This means that the data from only the last hour would be retrieved from the production database 104 and be subject to anomaly detection. Other time periods could be specified as well.

At step 306, the relevant data may then be retrieved from the production database 104 based on the retrieval request.

In addition to the filtering shown in FIG. 3, the data in the production database 104 may also be aggregated to build up the test time series signals, as a further aspect of specifying the to be checked for anomalies. An example of data aggregation is shown in FIG. 4. It may be noted that, while filtering is done just at the data retrieval steps, aggregation may be applied multiple time to retrieved data, for example at the start of each counter process. At step 402 the next metric for which to build up the test time series signal may be selected. At the next step 404, the relevant data are aggregated according to the preferences set stored in the configuration file. As described above, preferences may be set and stored in the configuration file by a user.

Once the data have been aggregated, the test time series signal may the built up or constructed in step 406. Once the time series signal (e.g., time series data) has been constructed, execution depends on whether or not a reference pattern for the selected metric already exists.

Specifically, if no reference pattern yet for this metric and at this aggregation level exists yet, the process then proceeds to step 408, which entails building up a training set that can then be used to generate a reference pattern. As indicated, pattern generation is carried out at step 410.

If instead a reference pattern already exists, it may be retrieved from the reference pattern database 108, as indicated at step 412. A relevant threshold may also be retrieved with the pre-existing reference pattern.

Figure 5:
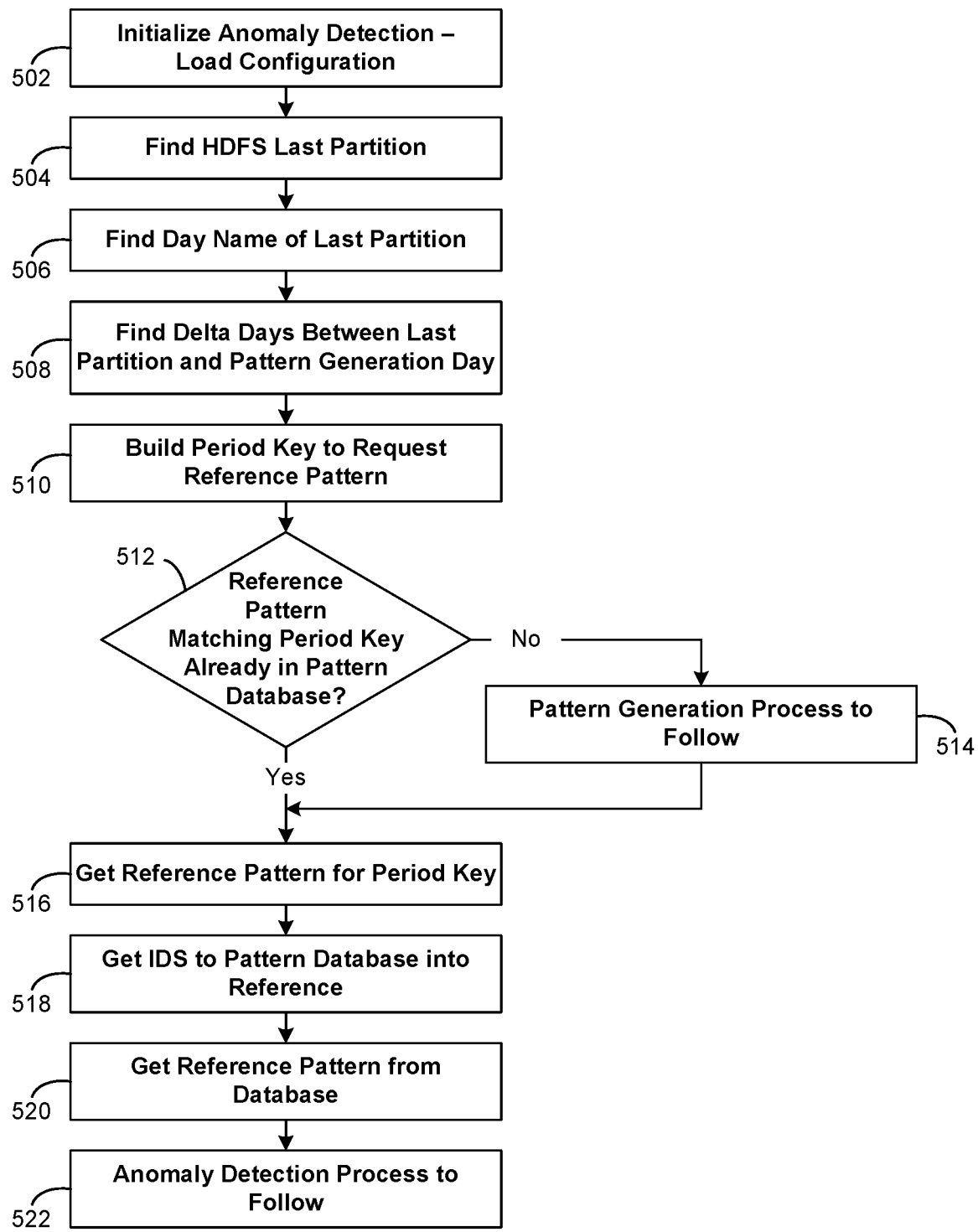
FIG. 5 is a flow chart illustrating an example of obtaining a correct reference pattern for anomaly detection in an example anomaly detection process, in accordance with example embodiments.

FIG. 5 next illustrates how the correct reference pattern for a given time series signal may be retrieved from the reference pattern database 108. In particular, FIG. 5 is a flow chart illustrating an example of obtaining a correct reference pattern for anomaly detection in an example anomaly detection process, in accordance with example embodiments.

The process is initiated at step 502, which also entails loading of configuration. At step 504, the last partition of the distributed file system is located, followed at step 506 by determination of the name of the day to which last partition corresponds. The number of days that have passed since the last generation of a reference pattern is next determined at step 508, and a retrieval key is then generated at step 510. More generally, the time since the last pattern generation may be measured in any time unit appropriate to the time series and temporal processes and time scales under consideration. Thus, "days since the last pattern generation" is illustrative. For the current example using days, the key, which may be used to identify a unique reference pattern, is a function of the number of days that have passed since the last reference pattern generation day, and also of the nature of the relevant metric and the type of filtering and aggregation done on the data. There may be other possible factors in key generation, as well.

The next step, 512, entails checking whether there is already a reference pattern stored in the reference pattern database 108 that matches the generated key. If not, then a reference pattern first needs to may be generated at step 514. Note that a failure to find matching pattern includes the possibility of finding an out of date or expired pattern. In accordance with example embodiments, reference patterns may expire after a predetermined amount of time. Further, the predetermined amount of time may be stored in the configuration file.

If there is a reference pattern matching the period key in the reference pattern database 108, the process then goes to steps 516 to 520. Specifically, the matching reference pattern is fetched from the reference pattern database 108. Once the reference pattern is retrieved, anomaly detection may be carried out at step 522.

Figure 6:
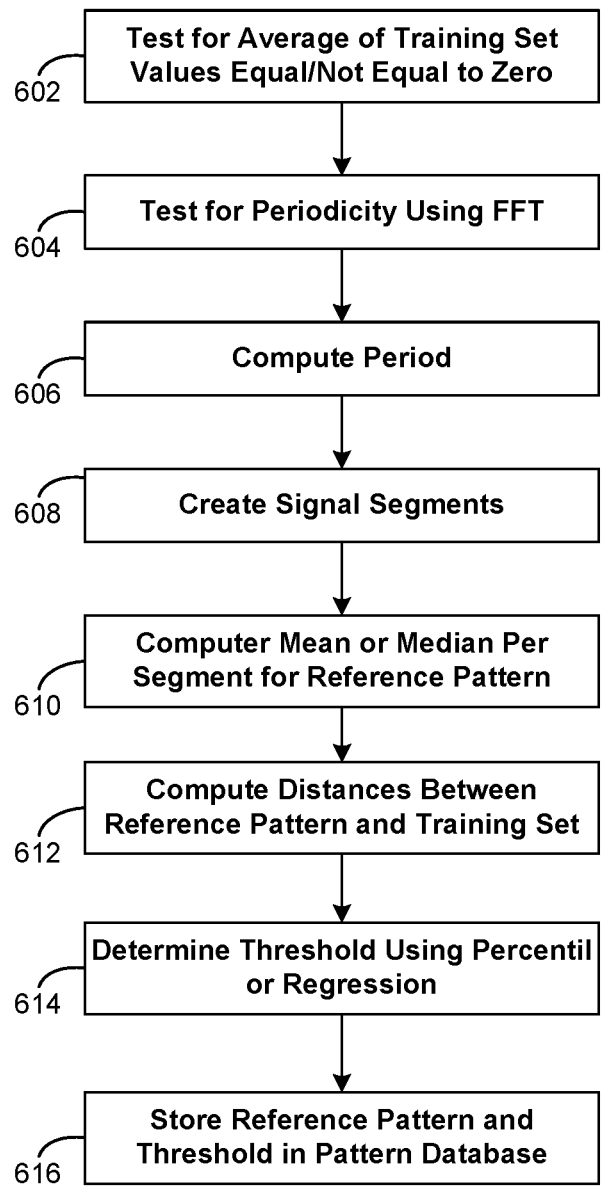
FIG. 6 is a flow chart illustrating example generation of reference patterns, in accordance with example embodiments.

FIG. 6 is a flow chart illustrating example generation of reference patterns, in accordance with example embodiments. The process of reference pattern generation process may be considered a learning or training phase of the anomaly detection algorithm 102. The first step 602 of the process of FIG. 6 initiates a test for periodicity of the time series signal to be analyzed. In an example embodiment, this test may entail computing a fast Fourier transform (FFT) of the time series data, as shown at step 604. By way of example, the test looks for a periodicity of one week, however, the test may search for other periodicities. If the average of the time series is zero, this may generally be taken as an indication that the signal is not periodic. A more rigorous test would be to determine that the maximum value equals zero. Such a determination, if made, would obviate the need for testing with an FFT. In the example of FIG. 6, a period is detected, which may entail computation of the period at step 606, followed by creation of signal segments at step 608. By way of example, signal segments are created on a granularity of days and hours. As used herein signal segments, or just segments, correspond to a sampling interval between individual data or sample values of a time series.

In accordance with example embodiments, a median value is computed per segment at step 610. More specifically, the time series data used for training or learning may span an observation time window that includes multiple periods of the data, where the period is that determined or confirmed by the FFT. The time series data may then be subdivided into subsets, each spanning one period, also referred to as a reference time period. In accordance with example embodiments, a minimum of three reference periods is used to determine the reference pattern. That is, the observation time window may be at least as long as three periods. The three (or more) subsets of data each include the same number N of sample points, each corresponding to a metric value. The three (or more) subsets may be time-aligned with a common reference time, such that their respective sample points also align. At each time-aligned sample point, there will therefore be three (or more) metric values, one from each subset. The median of the three (or more) metric values is taken at each respective sample point of the time-aligned subsets, and is set to a reference value of the reference pattern at the respective sample point. The set of all median values at all the sample points of the time-aligned subset thereby forms the sample pattern.

As described below, use of a median value provides an advantage over a mean value in the WAD algorithm, and is one of the bases for the improvement disclosed herein. An advantage of using the median may be understood by considering a simple example, in which the median of three metric values at a particular sample point is computed. Suppose, by way of example, the three values are 0, 14, and 16. The value of 0 is most likely an anomaly. The median of the three is 14. In contrast, the mean is 10. Thus, the median gives a better estimate of an anomaly-free reference value than does the mean, which is used in the WAD algorithm.

At step 612, distances between the pattern and the training set are determined. Then, at step 614, test thresholds may be determined using a regression method either instead of or in addition to using a percentile method. This, too, provides an improvement over existing WAD approaches. Further details of threshold determination are described below.

Finally, at step 616, the generated reference pattern and threshold are stored in the reference pattern database 108.

Figure 7:
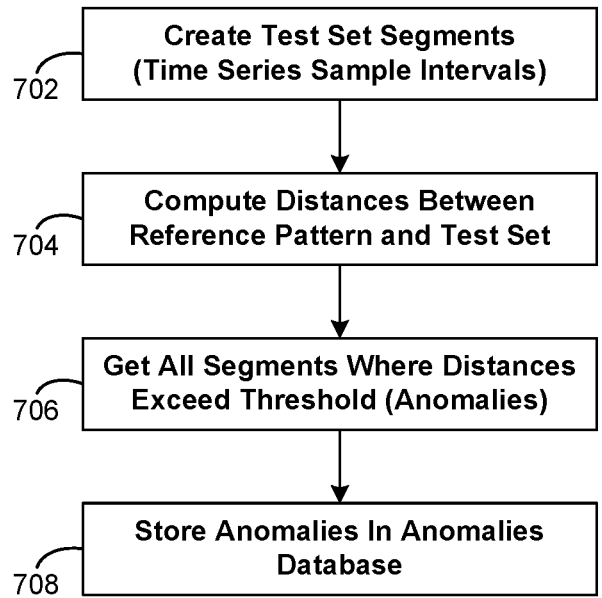
FIG. 7 is a flowchart illustrating an example of anomaly detection of an example anomaly detection process, in accordance with example embodiments.
Figure 8:
FIG. 8 is a graph showing an example time series test signal in comparison to an example envelope defined by a corresponding reference pattern and threshold, in accordance with example embodiments.

FIG. 7 is a flowchart illustrating an example of anomaly detection of an example anomaly detection process, in accordance with example embodiments. More particularly, once a pattern is generated and stored with the determined threshold, they may be applied in an example embodiment of the anomaly detection algorithm. At step 702, a test set of the time series data is created. The test set includes data segmented in time, such as days and/or hours. At step 704, distances between the pattern and the test set are computed. As described in connection with FIG. 2, the patterns may be retrieved from the pattern database 108. At step 706, the computed distances are compared with the threshold, and those that exceed the threshold are identified as anomalies. Finally, the identified anomalies are stored in the anomaly database 110. Subsequently, the anomaly data may be retrieved and processed using various visualization applications enabling a user to examine and analyze the anomalies.

FIG. 8 is a graph showing an example time series test signal in comparison to an example envelope defined by a corresponding reference pattern and threshold, in accordance with example embodiments. The example time series test signal T is illustrative of time series data that may be analyzed for anomaly detection. By way of example, the time series test signal T is shown to include an anomaly, represented by a sharp, tall peak demarked with a black dot. The graph in FIG. 8 also shows corresponding reference pattern, which may be visualized as an envelope E surrounding the time series T. The anomaly to be detected here is the large spike in the time series at 3 AM. Also by way of example, the graph shows temporal evolution of the metric corresponding to the time series over 24 hours on Apr. 22, 2018.

Example embodiments disclosed herein provide at least four improvements over the WAD algorithm. These may be summarized as follows.

The use of the median value instead of the mean value during the learning phase of the algorithm to obtain an anomaly free pattern. Using the median value instead of the mean value leads to a more reliable pattern generation that is free of anomalies.

The use of a regression method instead of or in addition to a percentile method for calculating the thresholds. This provides a more accurate and reliable way to identify deviations between time series data and the reference pattern as anomalies.

The ability to generate time-dependent thresholds, where time dependence refers to sample times within a reference pattern. Time-dependent thresholds may be weighted depending on time, and may be computed using standard deviations of the test values used in determining the reference values at each sample point of the reference pattern.

The use of periodicities that most appropriate to the types of time series data under consideration. For example, for telecommunications data, weekly patterns may be better suited than daily patterns for generating reference patterns and identifying anomalies. This may be because weekly patterns allow for the differentiation between weekends and weekdays.

As noted above, using the median instead of the mean in determining the pattern allows data that includes anomalies to be included in pattern generation, while at the same time suppressing the influence of anomalous data values in the pattern. The advantage of using periodicities appropriate to the time series data under consideration may be further enhanced by use of a sliding time window. As described below, this allows natural trends in the data over time scales longer than the periodicity to be accommodated without such trends being mistaken as anomalies. Considering the example of telecommunications call traffic that exhibits a weekly period, a natural growth trend in call traffic over the course of one year may induce only a mild effect over the course of, say, a three week sliding time window, such that three weeks of data are sufficient to determine a pattern and identify anomalies during any given three week window. At the same time, advancing the sliding window by one week may be sufficient to observe changes in the pattern, such that the need for generating a new pattern every one or a few weeks may be detected and used to trigger operations to update the pattern and threshold.

C. Example Use Case: Call Attempts in a Telecommunications Network

The example operations described above in terms of flow charts may be further illustrated by considering a particular application or use case involving call attempts in a telecommunications network. The following discussion refers, in particular, to FIGS. 9-15.

In the example use case, the anomaly detection algorithm may used to detect anomalies in the number of call attempts per hour for a given radio cell of a mobile communications network. The use case presented is based on simulated data. However, there is no loss of generality, and the anomaly detection algorithm may be implemented in an actual operational environment of a telecommunications network.

The simulation illustrated by FIGS. 9 to 15 is based on the following scenario.

Figure 9:
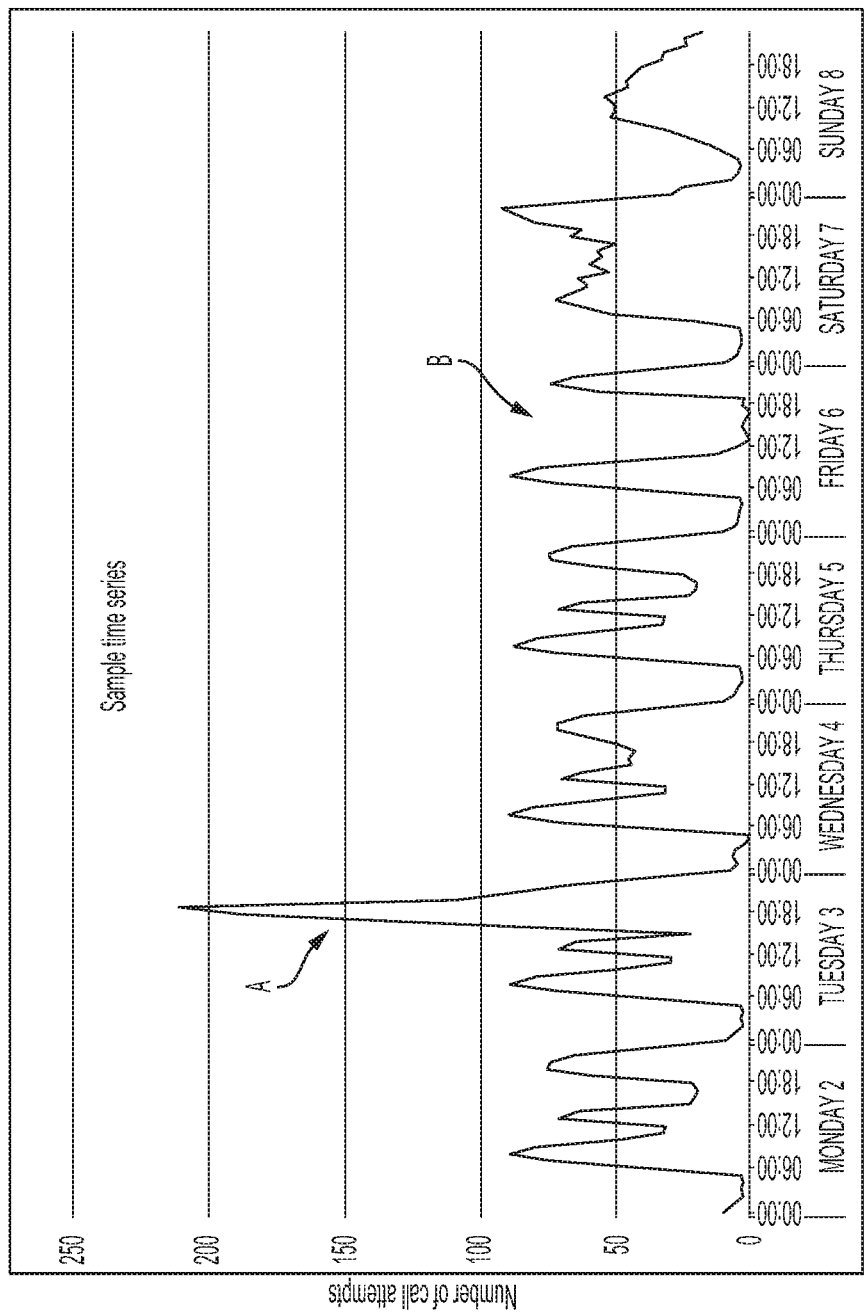
FIG. 9 is a plot showing a curve illustrating an example of time series data that contain anomalies, in accordance with example embodiments.

Call attempts per hour made by mobile subscribers in a radio cell located in Montreal, Canada are monitored during the week from 2 to 8 Jul. 2018. The result of the (simulated) monitoring is shown in FIG. 9. Experience shows that metrics such as the number of call attempts in a given cell have a pseudo-periodicity of one week. In other words, the mobile subscribers show more or less the same behavior from one week to the next. For the purposes of the discussion here, a pseudo periodic time series may be considered a time series that exhibits at least approximate periodicity. More precisely, the sample point values may repeat to within a predetermined threshold deviation with an observed and/or measurable period. For the example of call attempt data, a period of one week may be observed, such that the number of call attempts during the same hour of the same day each week is the same to within a threshold. The number need not be identically equal during the same hour of the same day each week; just within the threshold. Of course, any given sample may deviate by more than the threshold. Such a deviation may represent an anomaly if it meets the criteria of the anomaly detection algorithm disclosed herein.

FIG. 9 is a plot showing a curve illustrating an example of time series data that contain anomalies, in accordance with example embodiments. During the week shown in the figure, two anomalies have taken place. The first anomaly is referenced by the label A. By way of example, it is an unusual increase in the number of call attempts on Tuesday, July 3 between 3 PM and midnight. This could be caused, for example, by a large number of students that have just left the exam center of a university located in the cell and then start calling their relatives and friends to report on the outcome of the exam.

The second anomaly is indicated by the label B. It corresponds to an unusual dip in the number of call attempts on Friday, July 6 during the afternoon. This could be caused, for example, by an evacuation in Montreal affecting the radio cell. During the evacuation, very few people are left in the cell so that very few calls are made.

The following discussion explains how the anomaly algorithm of the example embodiments herein may detect the two anomalies A and B.

Figure 10:
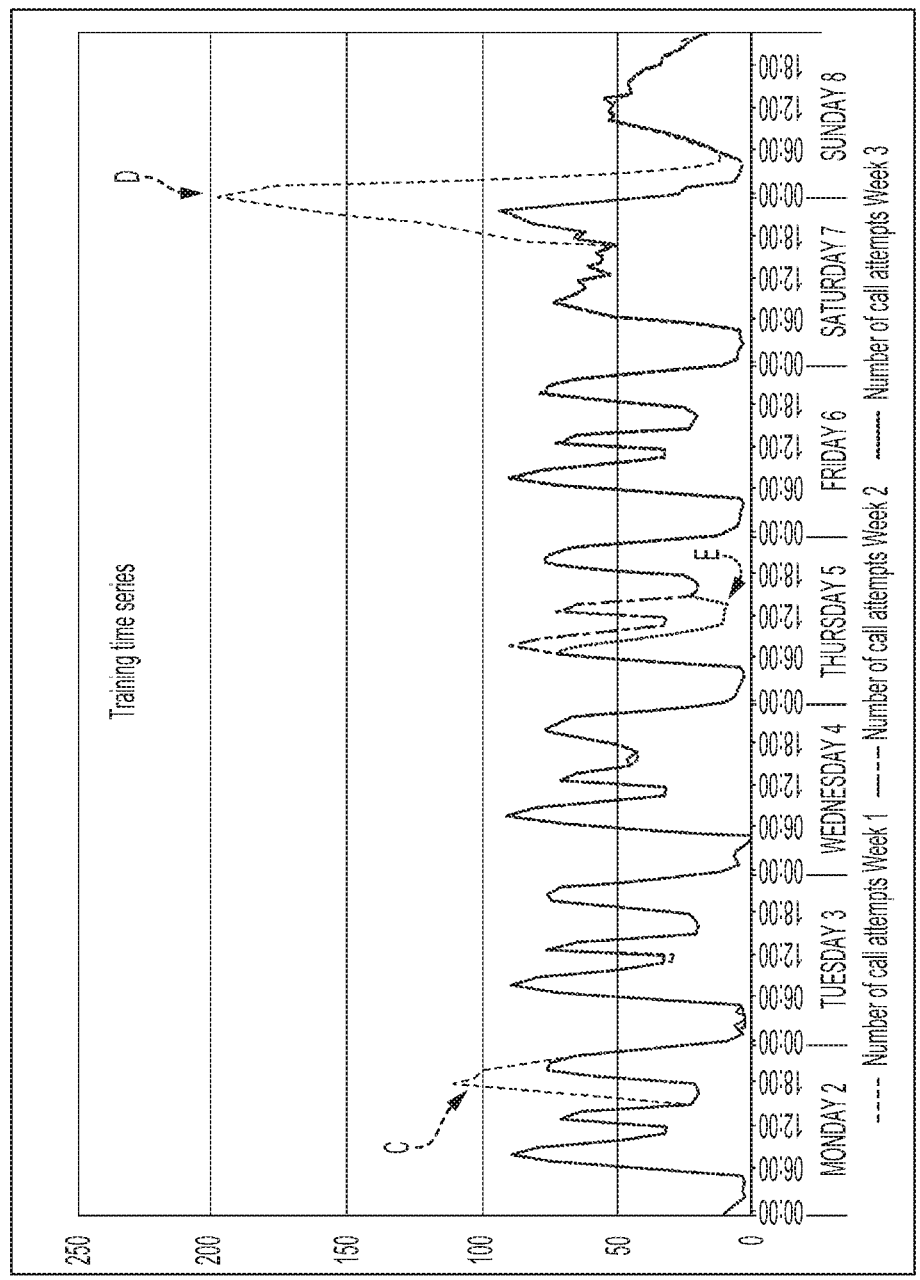
FIG. 10 is a plot illustrating an example of alignment of different reference periods of training time series data, in accordance with example embodiments.

First, the algorithm goes through its reference model generation phase. The reference model generation phase is based on a training time series, which is illustrated by FIG. 10, which is a plot illustrating an example of alignment of different reference periods of training time series data, in accordance with example embodiments. The training time series consists of the number of call attempts per hour over a time period of three weeks. In FIG. 10, those three weeks are overlaid and time-aligned to visualize the anomalies. The dashed curve shows the number of call attempts for the first week, the dashed-dotted curve the number of call attempts for the second week, and the dotted curve the number of call attempts for the third week. Each week corresponds to one subset of the training time series.

In the first subset corresponding to the first week there are evidently, and by way of example, two anomalies, C and D. These are unusual increases in the number of call attempts. The first one is on Monday, whereas the second one is in the night between Saturday and Sunday.

The second subset corresponding to the second week does not display any noticeable anomalies.

The third subset corresponding to the third week evidently, and also by way of example, has an anomaly referenced E. This anomaly is an unusually low number of call attempts on Thursday.

Figure 11:
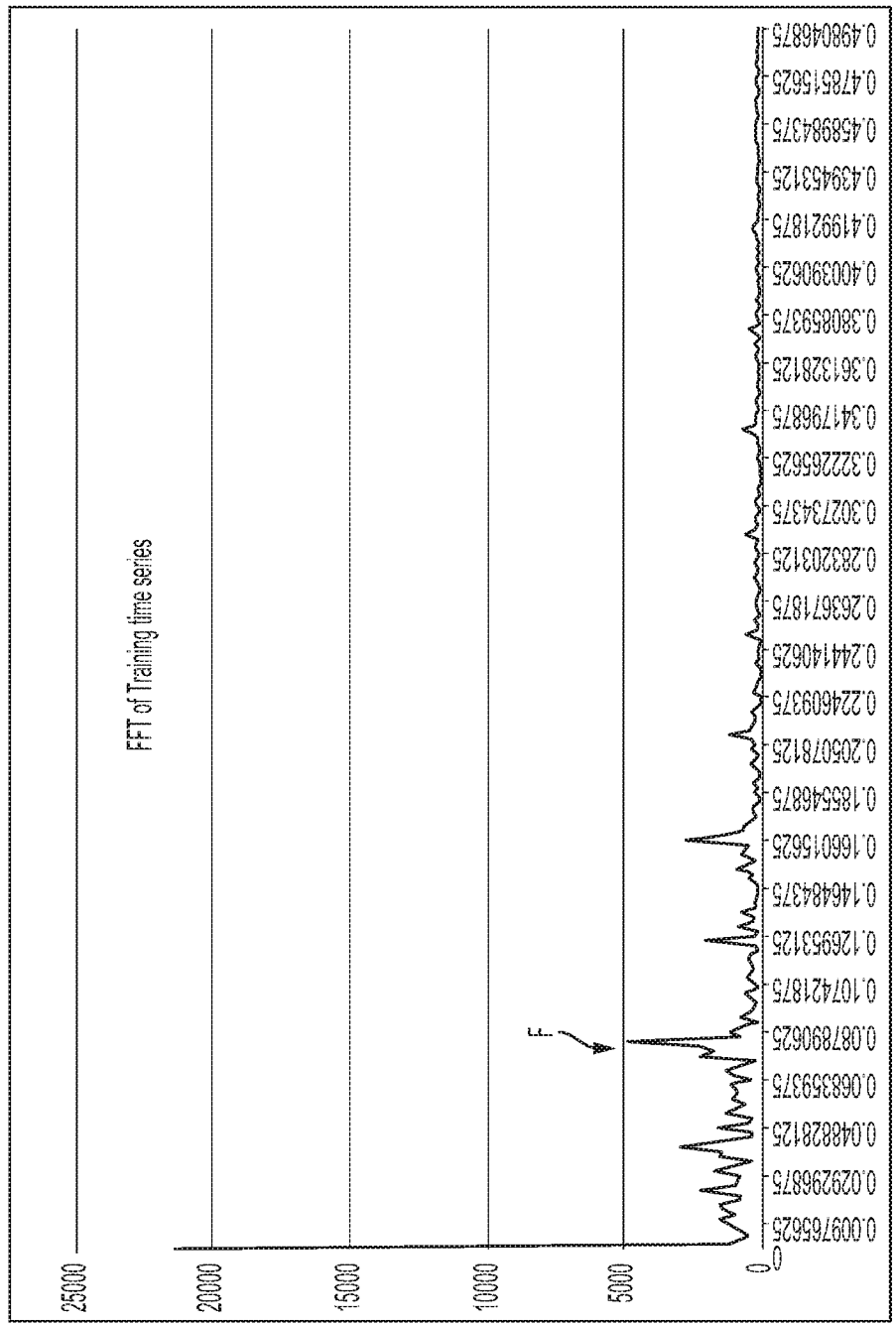
FIG. 11 is a plot illustrating a fast Fourier transform of example time series data, in accordance with example embodiments.

In accordance with example embodiments, the whole training time series spanning the three weeks is subjected to a Fast Fourier (FFT) transform, the result of which is shown in FIG. 11. This FFT displays a dominant frequency F, which, in the current example, corresponds to the fixed reference time period of one week.

Hence, the training time series of FIG. 10 can be used to generate the reference model. That is, the periodicity test has confirmed periodicity (or pseudo-periodicity).

Figure 12:
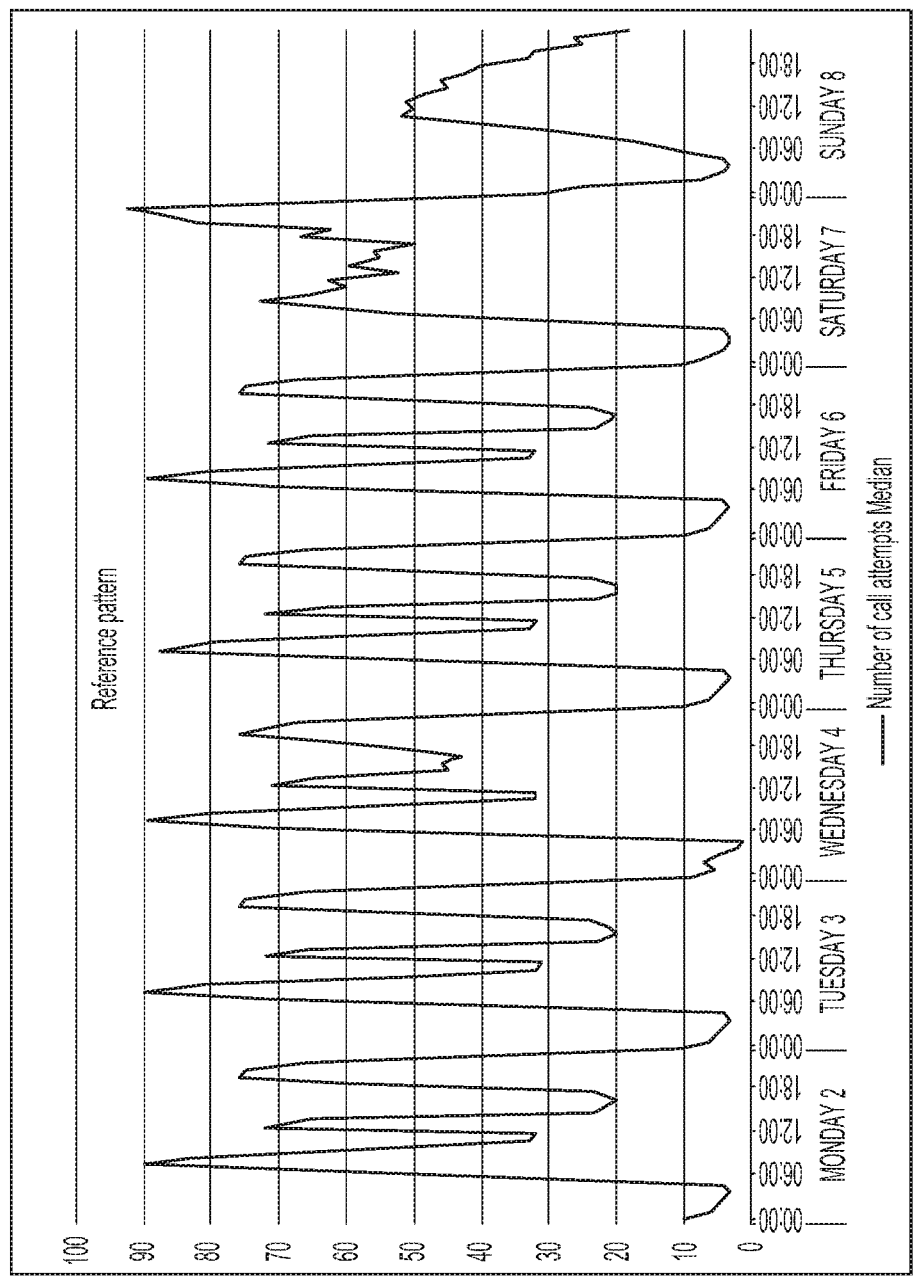
FIG. 12 is a plot showing an example reference pattern, in accordance with example embodiments.

The next step is to obtain or generate a reference pattern. This is illustrated in FIG. 12, which is a plot showing an example reference pattern, in accordance with example embodiments. In particular, FIG. 12 depicts a reference pattern generated from the three weeks of data shown in FIG. 10. As described above, this may be achieved by, for each hour of the week, taking the corresponding value for each of the three curves of FIG. 10, and then computing the median value for each of these three values. The resulting reference pattern shown in FIG. 12 is a time series of median values, representing the anomaly free behavior of the number of call attempts per hour over any given one week of the training data. That is, the reference pattern shows what an anomaly-free week would look like.

It is noteworthy that because the algorithm uses the median value instead of the mean value, the reference pattern is not noticeably affected by the anomalies C, D and E shown in FIG. 10.

Having established the reference pattern, the algorithm may now determine the reference threshold. This is done by comparing each of the three subsets shown in FIG. 10 with the reference pattern shown in FIG. 12 and storing the size of each deviation between a subset value and its corresponding value in the reference pattern. In the present example, this results in 7×24×3=504 deviation values. The deviations may then be ranked from smallest to largest, yielding a deviation sequence. The deviation sequence is represented as a curve in FIG. 13. That is FIG. 13 is a plot showing an example deviation sequence, in accordance with example embodiments.

Figure 13:
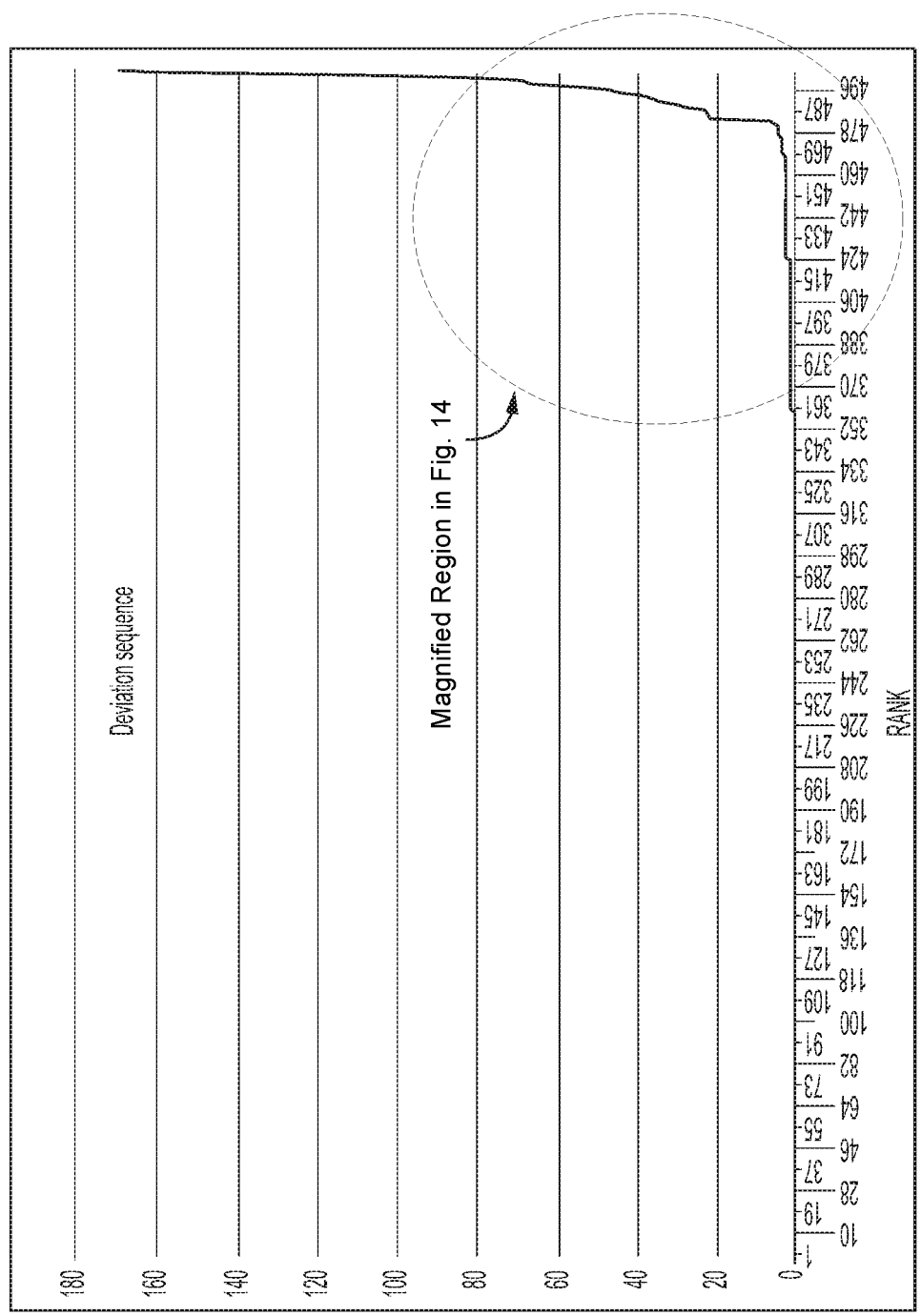
FIG. 13 is a plot showing an example deviation sequence, in accordance with example embodiments.
Figure 14:
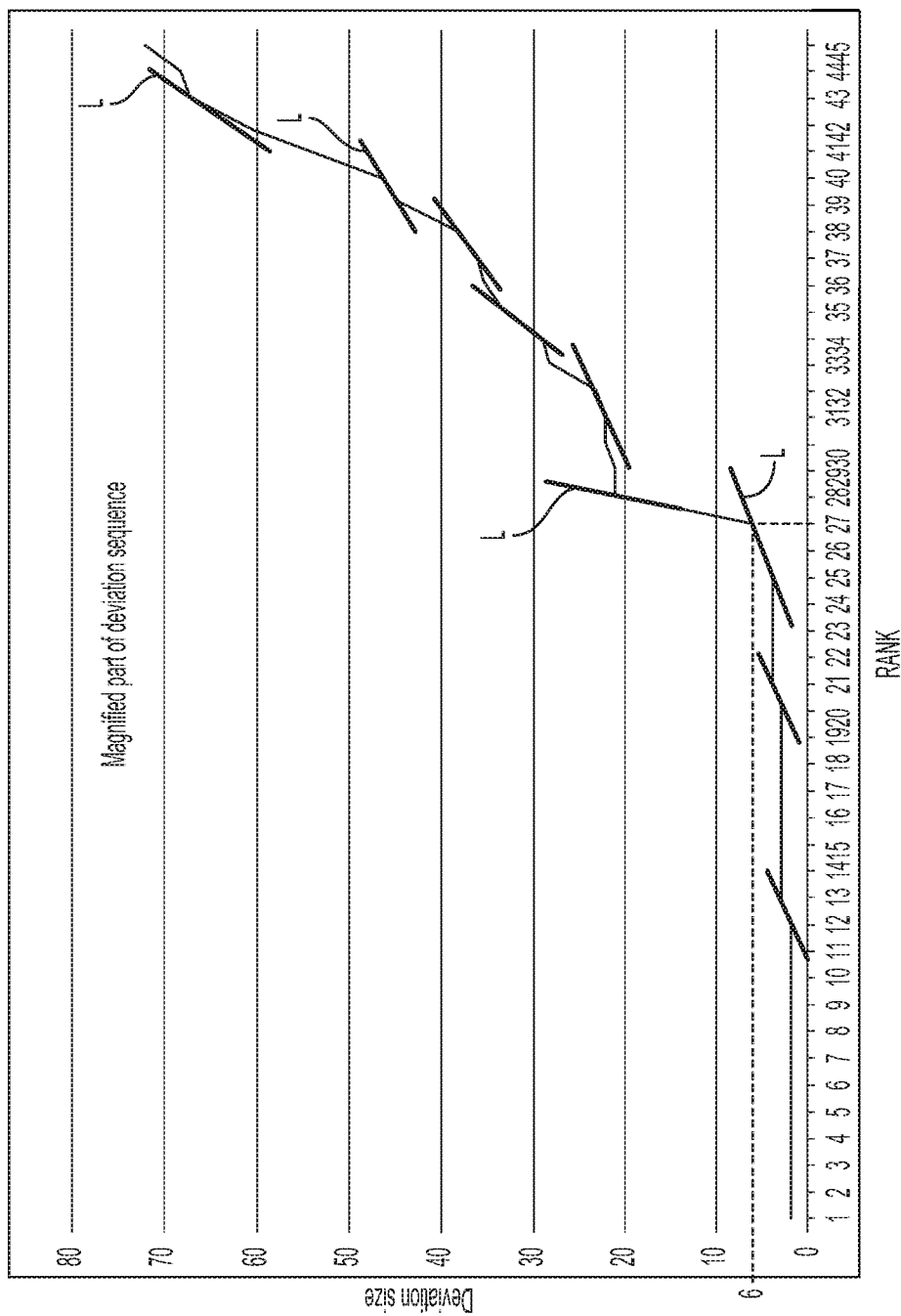
FIG. 14 is a plot showing a magnified view of a section of an example deviation sequence for threshold determination, in accordance with example embodiments.

Determination of the threshold is made by considering the region of the deviation sequence curve containing the most rapid increase, and indicated in FIG. 13 by the dashed oval. The magnified portion of FIG. 13 is shown in FIG. 14, which is a plot showing a magnified view of a section of an example deviation sequence for threshold determination, in accordance with example embodiments.

Using a piecewise linear regression, the slope of the curve of FIG. 13 as a function of deviation sequence rank may be estimated. This is illustrated by the lines labeled L in FIG. 14. The deviation size within the deviation sequence at which the slope is the largest while still remaining below a predetermined slope upper limit is then set as the reference threshold for the reference model.

In the present example, there is a large increase in the slope from rank 25 to rank 28. The slope from rank 27 to 28, is above the predetermined slope upper limit. Accordingly, the reference threshold is set at 6, which is the deviation size at rank 27.

Using a slope estimation instead of a percentile method, such as is used in the WAD algorithm, to determine the reference threshold reduces the risk of defining a too high reference threshold. Note that too high a threshold would result in missed anomalies, since the threshold may be considered a tolerance for deviations between time series data and the reference pattern not being anomalies.

Figure 15:
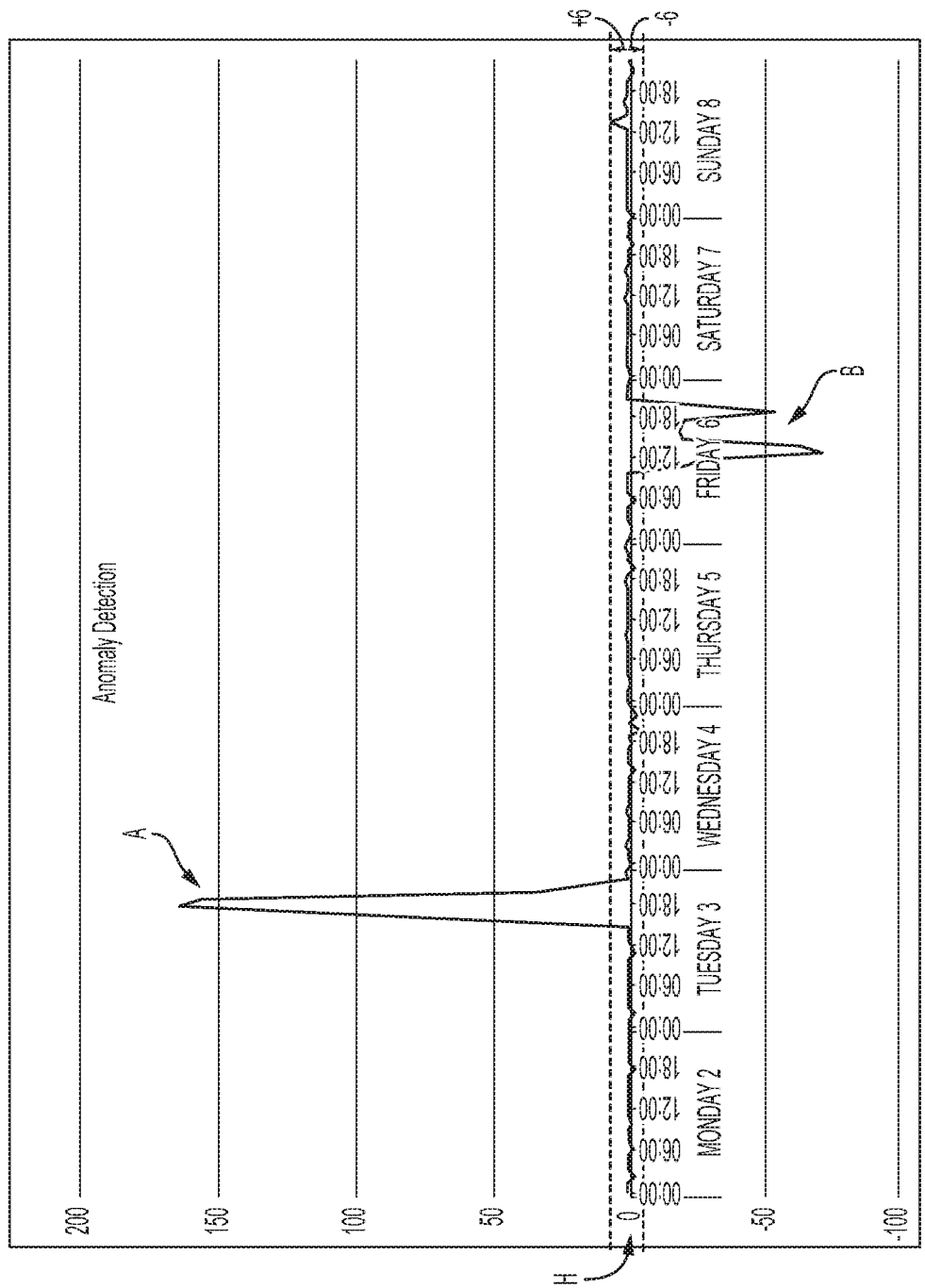
FIG. 15 is a plot illustrating an example of anomaly detection based on a reference pattern and threshold, in accordance with example embodiments.

The reference model having been established, the next step is now to detect the anomalies in the sample time series of FIG. 9. This is shown in FIG. 15, which is a plot illustrating an example of anomaly detection based on a reference pattern and threshold, in accordance with example embodiments.

This is done by subtracting the reference pattern of FIG. 12 from the sample time series of FIG. 9. The result is shown in FIG. 15, in which the curve of deviations represents differences between the sample time series and the reference pattern. A corridor labeled H in FIG. 15 corresponds to the determined reference threshold. It may be seen that the corridor extends six units above and below the horizontal axis.

The anomaly detection algorithm may now detect the deviation A as a first anomaly, since it extends above the corridor H. It will also detect the deviation B as a second anomaly, since it extends below the corridor H. Comparison with FIG. 9 reveals that the anomaly detection algorithm has correctly detected the two anomalies.

In accordance with example embodiments, for each reference value of the reference pattern—e.g., each computed median value—a standard deviation may also be computed. The effectively provides an indication of the spread of the individual metric values about the median at each sample point. This allows a distinct threshold to be determined for each sample point of the reference pattern. Such a threshold is referred to herein as a time-dependent threshold. Considering again the corridor H in FIG. 15, a time-dependent threshold would result in a corridor of varying width as a function of time across the deviation plot of FIG. 15.

In an alternative embodiment, the anomaly detection as described above may additionally involve the use of a mathematical transform. One may in particular use the Difference over Minimum or DoM transform. Using a mathematical transform may, however, be considered optional. Using the DoM transform may be advantageous for considering strong variations in the time series.

II. EXAMPLE COMPUTING SYSTEM

Figure 16:
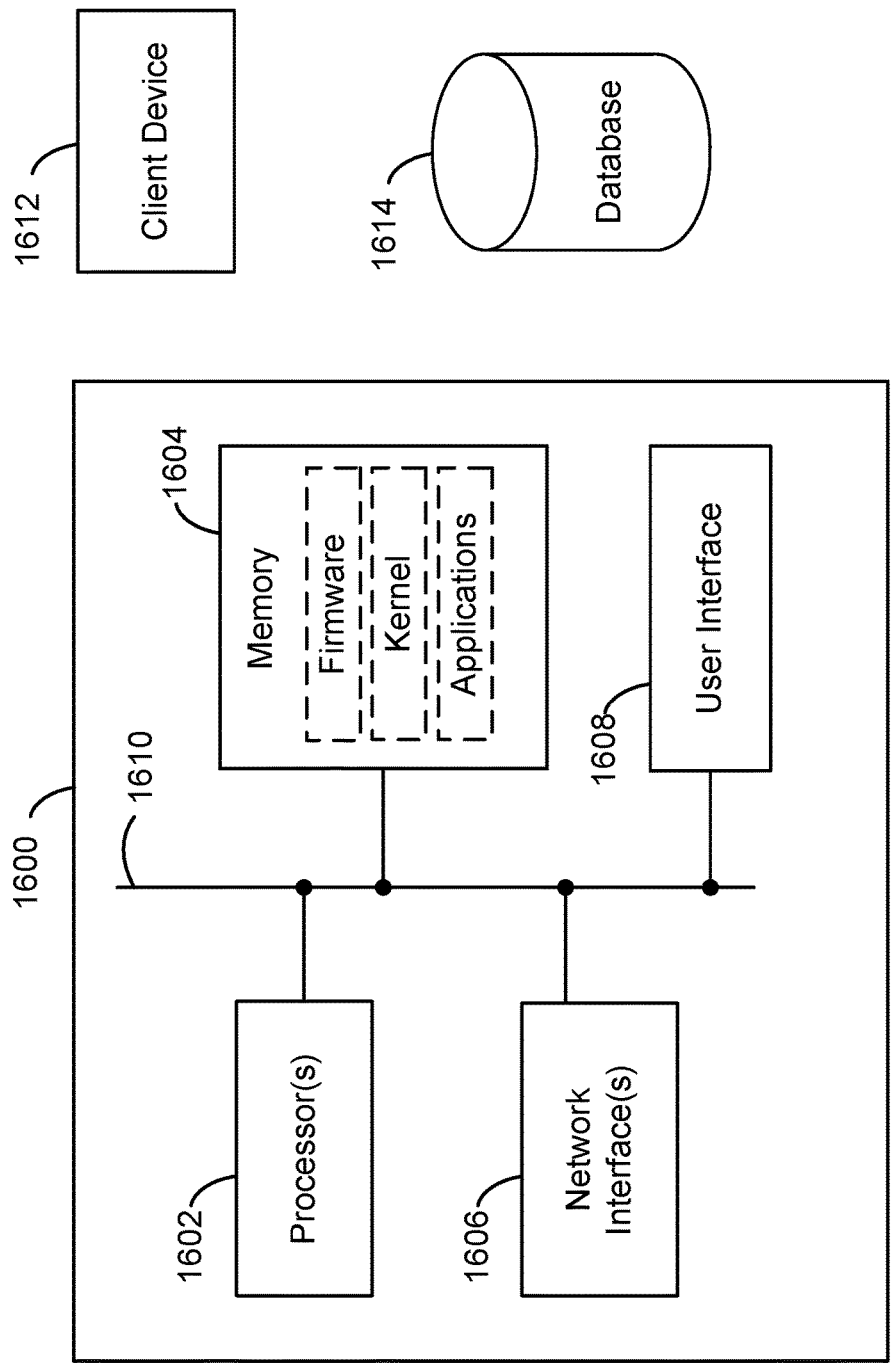
FIG. 16 is a simplified block diagram of an example computing system in which anomaly detection may be implemented, in accordance with example embodiments.

FIG. 16 is a simplified block diagram of an example computing system (or computing device) 1600. The computing system 1600 may be representative of a component of a Big Data distributed file system, or may be communicatively connected a Big Data distributed file system, for example. The computing system 1600 can be configured to perform and/or can perform one or more acts, such as the acts described in this disclosure. As shown, the computing device 1600 may include processor(s) 1602, memory 1604, network interface(s) 1606, and an input/output unit 1608. By way of example, the components are communicatively connected by a bus 1610. The bus could also provide power from a power supply (not shown).

Processors 1602 may include one or more general purpose processors and/or one or more special purpose processors (e.g., digital signal processors (DSPs) or graphics processing units (GPUs)). Processors 1602 may be configured to execute computer-readable instructions that are contained in memory 1604 and/or other instructions as described herein.

Memory 1604 may include firmware, a kernel, and applications, among other forms and functions of memory. As described, the memory 1604 may store machine-language instructions, such as programming code or non-transitory computer-readable storage media, that may be executed by the processor 1602 in order to carry out operations that implement the methods, scenarios, and techniques as described herein. In some examples, memory 1604 may be implemented using a single physical device (e.g., one magnetic or disc storage unit), while in other examples, memory 1604 may be implemented using two or more physical devices. In some examples, memory 1604 may include storage for one or more machine learning systems and/or one or more machine learning models as described herein.

In some instances, the computing system 1600 can execute program instructions in response to receiving an input, such as an input received via the communication interface 1606 and/or the user interface 1608. The data storage unit 1604 can also store other data, such as any of the data described in this disclosure.

The communication interface 1606 can allow the computing system 1600 to connect with and/or communicate with another entity according to one or more protocols. In one example, the communication interface 1606 can be a wired interface, such as an Ethernet interface. In another example, the communication interface 1606 can be a wireless interface, such as a cellular or WIFI interface.

The user interface 1608 can allow for interaction between the computing system 1600 and a user of the computing system 1600, if applicable. As such, the user interface 1608 can include, or provide an interface connection to, input components such as a keyboard, a mouse, a touch sensitive panel, and/or a microphone, and/or output components such as a display device (which, for example, can be combined with a touch sensitive panel), and/or a sound speaker. In an example embodiment, the client device 1612 may provide user interface functionalities.

The computing system 1600 can also include one or more connection mechanisms that connect various components within the computing system 1600. For example, the computing system 1600 can include a connection mechanism 1610 that connects components of the computing system 1600, as shown in FIG. 16.

Network interface(s) 1606 may provide network connectivity to the computing system 1600, such as to the internet or other public and/or private networks. Networks may be used to connect the computing system 1600 with one or more other computing devices, such as servers or other computing systems. In an example embodiment, multiple computing systems could be communicatively connected, and example methods could be implemented in a distributed fashion.

Client device 1612 may be a user client or terminal that includes an interactive display, such as a GUI. Client device 1612 may be used for user access to programs, applications, and data of the computing device 1600. For example, a GUI could be used for graphical interaction with programs and applications described herein. In some configurations, the client device 1612 may itself be a computing device; in other configurations, the computing device 1600 may incorporate, or be configured to operate as, a client device.

Database 1614 may include storage for input and/or output data, such a production database for storing time series data, a configuration database for storing configuration data, and/or an anomaly results database for storing results the anomaly detection techniques described herein.

In some configurations, the computing system 1600 can include one or more of the above-described components and can be arranged in various ways. For example, the computer system 1600 can be configured as a server and/or a client (or perhaps a cluster of servers and/or a cluster of clients) operating in one or more server-client type arrangements, for instance.

III. EXAMPLE METHOD

Figure 17:
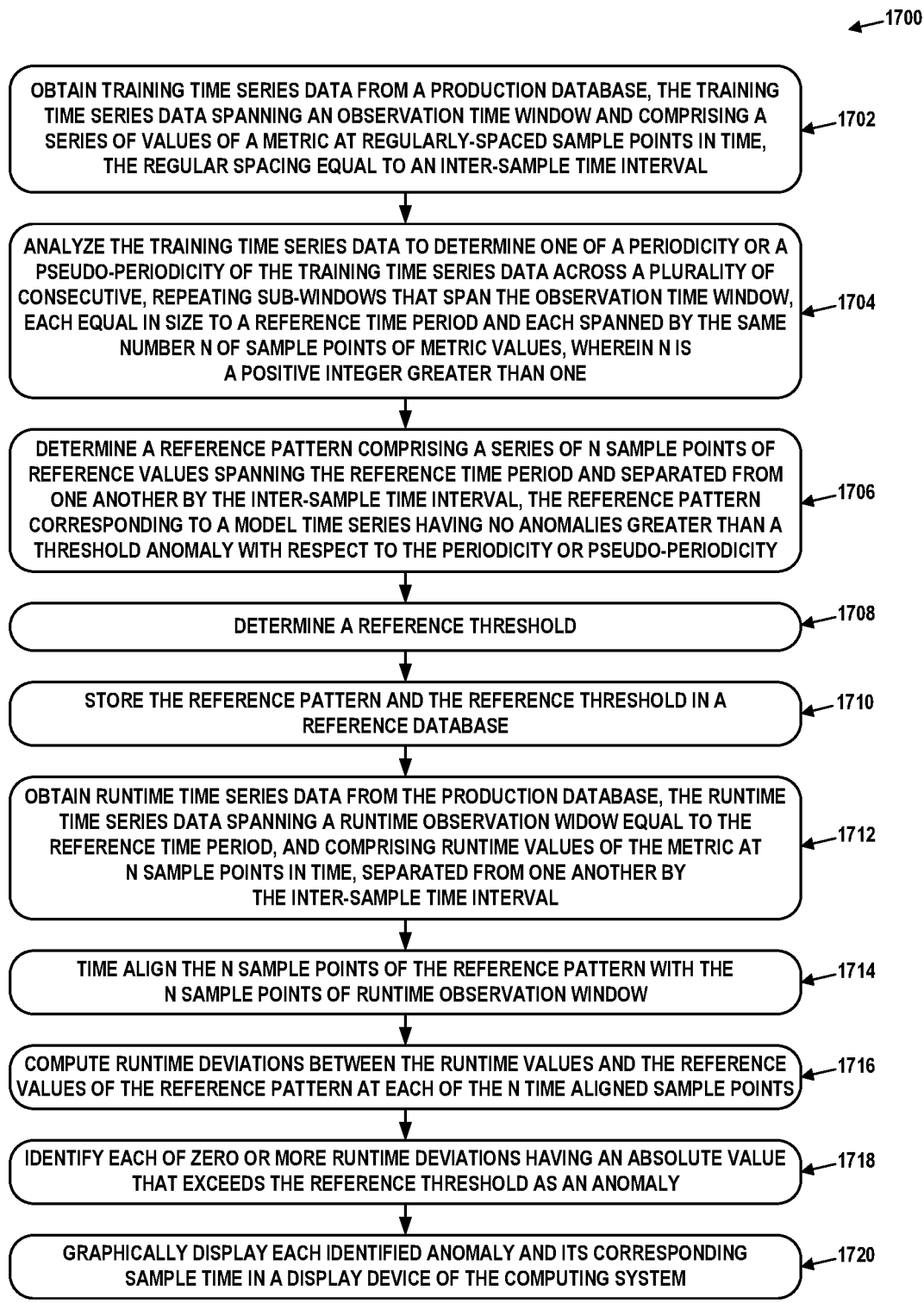
FIG. 17 is a flow chart of an example method, in accordance with example embodiments.

FIG. 17 show a flows chart a method 1700 illustrating an example embodiment a method for anomaly detection. The method illustrated by FIG. 17 may be carried out by, or in the context of, a Big Data distributed file system, which may include one or more a computing devices or systems, such as computing device 1600. However, the process can be carried out by other types of devices or device subsystems. For example, the process could be carried out by a portable computer, such as a laptop or a tablet device.

The embodiments of method 1700 may be simplified by the removal of any one or more of the features shown therein. Further, these embodiments may be combined with features, aspects, and/or implementations of any of the previous figures or otherwise described herein.

The example method 1700 may also be embodied as instructions executable by one or more processors of the one or more server devices of the system or virtual machine or container. For example, the instructions may take the form of software and/or hardware and/or firmware instructions. In an example embodiment, the instructions may be stored on a non-transitory computer readable medium. When executed by one or more processors of the one or more servers, the instructions may cause the one or more servers to carry out various operations of the example method.

Block 1702 of example method 1700 may involve obtaining training time series data from a production database, the training time series data spanning an observation time window and comprising a series of values of a metric at regularly-spaced sample points in time, the regular spacing equal to an inter-sample time interval.

Block 1704 may involve analyzing the training time series data to determine one of a periodicity or a pseudo-periodicity of the training time series data across a plurality of consecutive, repeating sub-windows that span the observation time window, each equal in size to a reference time period and each spanned by the same number N of sample points of metric values, wherein N is a positive integer greater than one.

Block 1706 may involve determining a reference pattern comprising a series of N sample points of reference values spanning the reference time period and separated from one another by the inter-sample time interval, the reference pattern corresponding to a model time series having no anomalies greater than a threshold anomaly with respect to the periodicity or pseudo-periodicity.

Block 1708 may involve determining a reference threshold.

Block 1710 may involve storing the reference pattern and the reference threshold in a reference database.

Block 1712 may involve obtaining runtime time series data from the production database, the runtime time series data spanning a runtime observation widow equal to the reference time period, and comprising runtime values of the metric at N sample points in time, separated from one another by the inter-sample time interval.

Block 1714 may involve time aligning the N sample points of the reference pattern with the N sample points of runtime observation window.

Block 1716 may involve computing runtime deviations between the runtime values and the reference values of the reference pattern at each of the N time aligned sample points.

Block 1718 may involve identifying each of zero or more runtime deviations having an absolute value that exceeds the reference threshold as an anomaly.

Finally, block 1720 may involve graphically displaying each identified anomaly and its corresponding sample time in a display device of the computing system.

In accordance with example embodiments, analyzing the training time series data to determine one of a periodicity or a pseudo-periodicity of the training time series data across the plurality of consecutive, repeating sub-windows may entail computing a fast Fourier transform (FFT) of the training time series data, identifying in the FFT a period equal to the reference time period in the FFT data. In practice, equality may not be exact, but rather to within a pre-determined statistical uncertainty. Additionally or alternatively, periodicity or pseudo-periodicity may be recognized by determining that a computed average value of the training time series data differs from zero by greater than a predefined statistical uncertainty, or that the time series data have maximum value of training data greater than zero even if the average is zero.

In accordance with example embodiments, the training time series data may be considered periodic if the respective values of the metrics across the observation time window repeat to within a predefined statistical uncertainty of a respective, repeating expected value with a period equal to the reference period. Similarly, the training time series data may be considered pseudo-periodic if the training time series data are periodic except for a non-zero but threshold-limited number of respective values of the metrics that deviate from the respective, repeating expected value by more than an anomaly threshold that is at least as large as the predefined statistical uncertainty.

In accordance with example embodiments, the plurality of consecutive, repeating sub-windows that span the observation time window includes at least three consecutive, repeating sub-windows. With this arrangement, determining the reference pattern may entail temporally aligning the N sample points of each of the plurality of consecutive, repeating sub-windows with respect to a common starting reference time, and computing a median of the values of the metric at each temporally aligned sample point. The reference values of the reference pattern may then be set to the computed median values.

In further accordance with example embodiments, determining a reference threshold may comprise computationally aligning the N sample points of the reference pattern with the N sample points of each of the plurality of consecutive, repeating sub-windows, and computing a deviation between the value of the metric and the reference value at each computationally aligned sample point. The deviation may then be arranged in a ranked deviation sequence, from smallest to largest, in which each ranked deviation is associated with a sample point and metric value of the training time series data. The reference threshold may then be set to the value of the metric at a particular sample point at which a rate of change between consecutive associated deviations is maximum among all consecutive deviations having rates of change below a rate upper limit.

In further accordance with example embodiments, the rates of change between the consecutive deviations in the ranked deviation sequence may correspond to a slope of a curve of the deviations as a function of ranking. As such, the method further entail determining the slope of the curve at associated sample points using piecewise linear regression.

The example method may further entail computing a respective standard deviation for each computed median value of the metric at each temporally aligned sample point, and computationally propagating the respective standard deviations to determine a respective threshold value at each sample point of the reference pattern. With this operation, a time-dependent reference threshold may be derived. That is, a different respective threshold may be determined for each sample point of the reference pattern.

In accordance with example embodiments, determining the reference pattern comprising the series of N sample points of reference values may entail retrieving a previously-determined reference pattern from the reference database. Similarly, determining a reference threshold may entail retrieving a previously-determined reference threshold from the reference database.

In accordance with example embodiments, the observation time window corresponds to a sliding time window that may be advance across the time series data in the production database. With this arrangement, determining the reference pattern may entail whether a previously-generated reference pattern in the reference database is out-of-date with respect to at least one of the runtime time series data or the sliding time window. The previously-generated reference pattern and an associated previously-determined threshold may be retrieved from a reference pattern database, for example. If the previously-generated reference pattern is not out of date, then it and the associated previously-determined threshold may be used instead of generating a new pattern and threshold. If the previously-generated reference pattern is out of date, then a new reference pattern and threshold may be generated according to the steps described above.

In accordance with example embodiments, the metric may characterize performance of an operational aspect of a telecommunications network. Non-limiting examples of the operational aspect may include operation of one or more network components, or operation of one or more communication sessions of users of the telecommunications network. In addition, the training time series data and the runtime time series data may be or include performance log data of the telecommunications network. In an example embodiment, the inter-sample time interval may be 15 minutes, one hour, or one day, and the reference time period may be one week. Other values for these timescales are possible as well.

The example method may further entail storing each identified anomaly in an anomaly database.

In accordance with example embodiments, the production database may be a single Big Data distributed file system (BDDFS), and the production database may include or be associated with configuration data including configuration parameters of the method. With this arrangement, the example method may further entail presenting the configuration parameters on an interactive user interface of the computing system, receiving input from the interactive user interface to modify zero or more configuration parameters, storing the modified configuration parameters, and carrying out at least one step of the method according to at least on stored configuration parameter.

In further accordance with example embodiment, the example method may also be able to operate in an autonomous mode in which the operations described in blocks 1702 through 1720 execute in an autonomous loop according to triggering criteria. In particular, the autonomous mode may entail applying the observation time window as a sliding window, and in response to determining that a previously-generated reference pattern is out of with respect to at least one of the sliding window or the runtime time series advancing the sliding window prior to obtaining the training time series data and the runtime time series, then determining the reference pattern as an updated reference pattern to the previously-generated pattern, and determining the reference threshold an updated reference threshold to a previously-generated reference threshold. Then, anomalies may be identified in the runtime time series obtained after advancing the time window.

In accordance with example embodiments, the configuration parameters may include one or more of a storage location in the BDDFS of the training time series data and the runtime time series data; an identity of the runtime time series data; one or more pre-processing parameters; specification of a mathematical technique for use in determining at least one of the reference pattern or the reference threshold; specification of a mathematical technique for use in analyzing the training time series data for periodicity or pseudo-periodicity; the inter-sample time interval; or the reference time period.

IV. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method for detecting anomalies in time series data, the method configured for operation in a computing system, and comprising:

obtaining training time series data from a production database, the training time series data spanning an observation time window and comprising a series of values of a metric at regularly-spaced sample points in time, the regular spacing equal to an inter-sample time interval;

analyzing the training time series data to determine a periodicity or a pseudo-periodicity of the training time series data across a plurality of consecutive, repeating sub-windows that span the observation time window, wherein the plurality includes three or more consecutive, repeating sub-windows, and wherein each sub-window is equal in size to a common reference time period and each is spanned by the same integer number N of sample points of metric values;

temporally aligning at least three of the repeating sub-windows with the same common starting time such that the at least three repeating sub-windows completely overlap with one another in a reference window, and the N sample points of each of the at least three repeating sub-windows are temporally aligned at N sample points of the reference window;

at each of the N sample points of the reference window, computing a median of temporally aligned metric values;

determining a reference pattern of N reference values at the N sample points of the reference window, each reference value being a different one of the computed medians, wherein the reference pattern models the periodicity or pseudo-periodicity of the training time series data in the sub-windows, and has no anomalies greater than a threshold anomaly value with respect to the determined periodicity or pseudo-periodicity;

determining a reference threshold;

storing the reference pattern and the reference threshold in a reference database;

obtaining runtime time series data from the production database, the runtime time series data spanning a runtime observation widow equal to the reference time period, and comprising runtime values of the metric at N sample points in time, separated from one another by the inter-sample time interval;

time aligning the N sample points of the runtime observation window with the N sample points of the reference pattern such that the runtime observation window completely overlaps with reference window;

computing runtime deviations between the runtime values and the reference values of the reference pattern at each of the N time aligned sample points of the overlapping runtime observation window and reference window;

identifying each of zero or more runtime deviations having an absolute value that exceeds the reference threshold as an anomaly; and graphically displaying each identified anomaly and its corresponding sample time in a display device of the computing system.

2. The computer-implemented method of claim 1, wherein analyzing the training time series data to determine a periodicity or a pseudo-periodicity of the training time series data across the plurality of consecutive, repeating sub-windows comprises:

computing a fast Fourier transform (FFT) of the training time series data; and identifying in the FFT a period equal to the reference time period to within a pre-determined statistical uncertainty.

3. The computer-implemented method of claim 1, wherein analyzing the training time series data to determine a periodicity or a pseudo-periodicity of the training time series data across the plurality of consecutive, repeating sub-windows comprises:

determining that a computed average value of the training time series data either: differs from zero by greater than a predefined statistical uncertainty, or equal to zero but with a maximum value of training data being greater than zero.

4. The computer-implemented method of claim 1, wherein analyzing the training time series data to determine a periodicity or a pseudo-periodicity of the training time series data across the plurality of consecutive, repeating sub-windows that span the observation time window comprises:

determining that the training time series data are periodic if the respective values of the metrics across the observation time window repeat to within a predefined statistical uncertainty of a respective, repeating expected value with a period equal to the reference period; and determining that the training time series data are pseudo-periodic if the training time series data are periodic except for a non-zero but threshold-limited number of respective values of the metrics that deviate from the respective, repeating expected value by more than an deviation threshold that is at least as large as the predefined statistical uncertainty.

5. The computer-implemented method of claim 1, wherein determining a reference threshold comprises:

computationally aligning the N sample points of the reference pattern with the N sample points of each of the plurality of consecutive, repeating sub-windows;

computing a deviation between the value of the metric and the reference value at each computationally aligned sample point;

ranking the computed deviations from smallest to largest, each ranked deviation being associated with a sample point and metric value of the training time series data; and setting the reference threshold to the value of the metric at a particular sample point at which a rate of change between consecutive associated deviations is maximum among all consecutive deviations having rates of change below a rate upper limit.

6. The computer-implemented method of claim 5, wherein the rates of change between the consecutive deviations correspond to a slope of a curve of the deviations as a function of ranking, and wherein the method further comprises determining the slope of the curve at associated sample points using piecewise linear regression.

7. The computer-implemented method of claim 5, further comprising:

computing a respective standard deviation for each computed median value of the metric at each temporally aligned sample point; and computationally propagating the respective standard deviations to determine a respective threshold value at each sample point of the reference pattern.

8. The computer-implemented method of claim 1, wherein determining the reference pattern comprises retrieving a previously-determined reference pattern from the reference database, and wherein determining a reference threshold comprises retrieving a previously-determined reference threshold from the reference database.

9. The computer-implemented method of claim 1, wherein the observation time window corresponds to a sliding time window, and wherein determining the reference pattern comprises:

making a determination that a previously-generated reference pattern in the reference database is out-of-date with respect to at least one of the runtime time series data or the sliding time window; and in response to the determination, generating a new reference pattern based on the training time series data in the observation time window.

10. The computer-implemented method of claim 1, wherein the metric characterizes performance of an operational aspect of a telecommunications network, and wherein the operational aspect is at least one of: operation of one or more network components, or operation of one or more communication sessions of users of the telecommunications network.

11. The computer-implemented method of claim 10, wherein the training time series data and the runtime time series data comprise performance log data of the telecommunications network.

12. The computer-implemented method of claim 10, wherein the inter-sample time interval is one of 15 minutes, one hour, or one day,
and wherein the reference time period is one week.

13. The computer-implemented method of claim 1, further comprising storing each identified anomaly in an anomaly database.

14. The computer-implemented method of claim 1, wherein the production database is comprised in a single Big Data distributed file system (BDDFS),
wherein the production database includes or is associated with configuration data comprising configuration parameters of the method,
and wherein the method further comprises:
presenting the configuration parameters on an interactive user interface of the computing system;
receiving input from the interactive user interface to modify zero or more configuration parameters;
storing the modified configuration parameters;
carrying out at least one step of the method according to at least on stored configuration parameter; and
executing in an autonomous mode comprising:
applying the observation time window as a sliding window;
in response to determining that a previously-generated reference pattern is out of with respect to at least one of the sliding window or the runtime time series: (i) advancing the sliding window prior to obtaining the training time series data and the runtime time series, (ii) determining the reference pattern as an updated reference pattern to the previously-generated pattern; (iii) determining the reference threshold an updated reference threshold to a previously-generated reference threshold; and (iv) identifying anomalies the runtime time series obtained after advancing the time window.

15. The computer-implemented method of claim 14, wherein the configuration parameters are at least one of:
a storage location in the BDDFS of the training time series data and the runtime time series data;
an identity of the runtime time series data;
one or more pre-processing parameters;
specification of a mathematical technique for use in determining at least one of the reference pattern or the reference threshold;
specification of a mathematical technique for use in analyzing the training time series data for periodicity or pseudo-periodicity;
the inter-sample time interval; or
the reference time period.

16. A system configured for detecting anomalies in time series data, the system comprising:
one or more processors; and
memory configured for storing instructions that, when executed by the one or more processors, cause the system to carry out operations including:
obtaining training time series data from a production database, the training time series data spanning an observation time window and comprising a series of values of a metric at regularly-spaced sample points in time, the regular spacing equal to an inter-sample time interval;
analyzing the training time series data to determine a periodicity or a pseudo-periodicity of the training time series data across a plurality of consecutive, repeating sub-windows that span the observation time window, wherein the plurality includes three or more consecutive, repeating sub-windows, and wherein each sub-window is equal in size to a reference time period and each spanned by the same integer number N of sample points of metric values;
temporally aligning at least three of the repeating sub-windows with the same common starting time such that the at least three repeating sub-windows completely overlap with one another in a reference window, and the N sample points of each of the at least three repeating sub-windows are temporally aligned at N sample points of the reference window;
at each of the N sample points of the reference window, computing a median of temporally aligned metric values;
determining a reference pattern of N reference values at the N sample points of the reference window, each reference value being a different one of the computed medians, wherein the reference pattern models the periodicity or pseudo-periodicity of the training time series data in the sub-windows, and has no anomalies greater than a threshold anomaly value with respect to the determined periodicity or pseudo-periodicity;
determining a reference threshold;
storing the reference pattern and the reference threshold in a reference database;
obtaining runtime time series data from the production database, the runtime time series data spanning a runtime observation widow equal to the reference time period, and comprising runtime values of the metric at N sample points in time, separated from one another by the inter-sample time interval;
time aligning the N sample points of the runtime observation window with the N sample points of the reference pattern such that the runtime observation window completely overlaps with reference window;
computing runtime deviations between the runtime values and the reference values of the reference pattern at each of the N time aligned sample points;
identifying each of zero or more runtime deviations having an absolute value that exceeds the reference threshold as an anomaly; and
graphically displaying each identified anomaly and its corresponding sample time in a display device of the system.

17. The system of claim 16, wherein the production database is comprised in a single Big Data distributed file system (BDDFS),
wherein the production database includes or is associated with configuration data comprising configuration parameters of the method,
and wherein the operations further include:
presenting the configuration parameters on an interactive user interface of the system;
receiving input from the interactive user interface to modify zero or more configuration parameters;
storing the modified configuration parameters; and
carrying out at least one step of the method according to at least on stored configuration parameter.

18. The system of claim 17, wherein the configuration parameters are at least one of:
a storage location in the BDDFS of the training time series data and the runtime time series data;
an identity of the runtime time series data;
one or more pre-processing parameters;

specification of a mathematical technique for use in determining at least one of the reference pattern or the reference threshold;

specification of a mathematical technique for use in analyzing the training time series data for periodicity or pseudo-periodicity;

the inter-sample time interval; or the reference time period.

19. An article of manufacture including a non-transitory computer-readable medium, having stored thereon program instructions that, when executed by one more processors of a system for detecting anomalies in time series data, cause the system to carry out operations including:

obtaining training time series data from a production database, the training time series data spanning an observation time window and comprising a series of values of a metric at regularly-spaced sample points in time, the regular spacing equal to an inter-sample time interval;

analyzing the training time series data to determine a periodicity or a pseudo-periodicity of the training time series data across a plurality of consecutive, repeating sub-windows that span the observation time window, wherein the plurality includes three or more consecutive, repeating sub-windows, and wherein each sub-window is equal in size to a reference time period and each spanned by the same integer number N of sample points of metric values;

temporally aligning at least three of the repeating sub-windows with the same common starting time such that the at least three repeating sub-windows completely overlap with one another in a reference window, and the N sample points of each of the at least three repeating sub-windows are temporally aligned at N sample points of the reference window;

at each of the N sample points of the reference window, computing a median of temporally aligned metric values;

determining a reference pattern of N reference values at the N sample points of the reference window, each reference value being a different one of the computed medians, wherein the reference pattern models the periodicity or pseudo-periodicity of the training time series data in the sub-windows, and has no anomalies greater than a threshold anomaly value with respect to the determined periodicity or pseudo-periodicity;

determining a reference threshold;

storing the reference pattern and the reference threshold in a reference database;

obtaining runtime time series data from the production database, the runtime time series data spanning a runtime observation widow equal to the reference time period, and comprising runtime values of the metric at N sample points in time, separated from one another by the inter-sample time interval;

time aligning the N sample points of the runtime observation window with the N sample points of the reference pattern such that the runtime observation window completely overlaps with reference window;

computing runtime deviations between the runtime values and the reference values of the reference pattern at each of the N time aligned sample points;

identifying each of zero or more runtime deviations having an absolute value that exceeds the reference threshold as an anomaly; and graphically displaying each identified anomaly and its corresponding sample time in a display device of the system.

* * * * *